(12) United States Patent
Bressler et al.

(10) Patent No.: US 12,059,847 B2
(45) Date of Patent: Aug. 13, 2024

(54) METHOD FOR ADDITIVE MANUFACTURING AN OBJECT

(71) Applicant: Stratasys Ltd., Rehovot (IL)

(72) Inventors: Yoav Bressler, Tel-Aviv (IL); Daniel Dikovsky, Ariel (IL); Mayan Rumbak, Mazkeret Batia (IL); Alexander Libinson, Holon (IL)

(73) Assignee: Stratasys Ltd., Rehovot (IL)

( * ) Notice: Subject to any disclaimer, the term of this patent is extended or adjusted under 35 U.S.C. 154(b) by 246 days.

(21) Appl. No.: 17/598,319

(22) PCT Filed: Mar. 29, 2020

(86) PCT No.: PCT/IL2020/050379
§ 371 (c)(1),
(2) Date: Sep. 27, 2021

(87) PCT Pub. No.: WO2020/194318
PCT Pub. Date: Oct. 1, 2020

(65) Prior Publication Data
US 2022/0161504 A1    May 26, 2022

Related U.S. Application Data

(60) Provisional application No. 62/825,047, filed on Mar. 28, 2019.

(51) Int. Cl.
*B29C 64/371* (2017.01)
*B29C 64/112* (2017.01)
(Continued)

(52) U.S. Cl.
CPC .......... *B29C 64/393* (2017.08); *B29C 64/112* (2017.08); *B29C 64/364* (2017.08);
(Continued)

(58) Field of Classification Search
CPC ... B29C 64/112; B29C 64/364; B29C 64/371; B29L 2022/00; B29L 2031/60;
(Continued)

(56) References Cited

U.S. PATENT DOCUMENTS 6,623,687 B1 * 9/2003 Gervasi .................. B29C 64/40
264/308 X
6,936,212 B1 8/2005 Crawford
(Continued)

FOREIGN PATENT DOCUMENTS

EP    3450167    3/2019
JP    2012-040727    3/2012
(Continued)

OTHER PUBLICATIONS

Translation of JP 2019018526 A (published on Feb. 7, 2019).*
(Continued)

*Primary Examiner* — Leo B Tentoni

(57) ABSTRACT

An additive manufacturing method for printing an object includes receiving three-dimensional printing data corresponding to the object, defining an internal region of the object to be formed with a structured air pocket and printing the object with an additive manufacturing system. The object includes an internal region formed with a structured air pocket.

20 Claims, 22 Drawing Sheets

(51) Int. Cl.
  *B29C 64/364* (2017.01)
  *B29C 64/393* (2017.01)
  *B33Y 10/00* (2015.01)
  *B33Y 40/00* (2020.01)
  *B33Y 50/02* (2015.01)
  *B29L 22/00* (2006.01)
  *B29L 31/60* (2006.01)

(52) U.S. Cl.
  CPC ............... *B33Y 10/00* (2014.12); *B33Y 40/00* (2014.12); *B33Y 50/02* (2014.12); *B29L 2022/00* (2013.01); *B29L 2031/60* (2013.01)

(58) Field of Classification Search
  CPC .............. B29L 2031/608; B33Y 10/00; G05B 2219/49008; G05B 2219/49023
  USPC ........................................................ 264/308
  See application file for complete search history.

(56) References Cited

U.S. PATENT DOCUMENTS

| | | | |
|---|---|---|---|
| 2004/0141018 A1 | 7/2004 | Silverbrook | |
| 2004/0143358 A1* | 7/2004 | Silverbrook | B29C 64/112 700/121 |
| 2010/0191360 A1 | 7/2010 | Napadensky et al. | |
| 2014/0255647 A1 | 9/2014 | Johnson et al. | |
| 2016/0059489 A1* | 3/2016 | Wang | B29C 64/393 700/119 |
| 2017/0050374 A1* | 2/2017 | Minardi | B33Y 10/00 |
| 2017/0120333 A1* | 5/2017 | DeMuth | B33Y 10/00 |

FOREIGN PATENT DOCUMENTS

| | | |
|---|---|---|
| JP | 2018-115243 | 7/2018 |
| JP | 2019-018526 | 2/2019 |
| WO | WO 2020/194318 | 10/2020 |

OTHER PUBLICATIONS

International Preliminary Report on Patentability Dated Oct. 7, 2021 From the International Bureau of WIPO Re. Application No. PCT/IL2020/050379. (9 Pages).

International Search Report and the Written Opinion Dated Sep. 8, 2020 From the International Searching Authority Re. Application No. PCT/IL2020/050379. (14 Pages).

Communication Pursuant to Article 94(3) EPC Dated Mar. 18, 2024 From the European Patent Office Re. Application No. 20720945.3. (6 Pages).

* cited by examiner

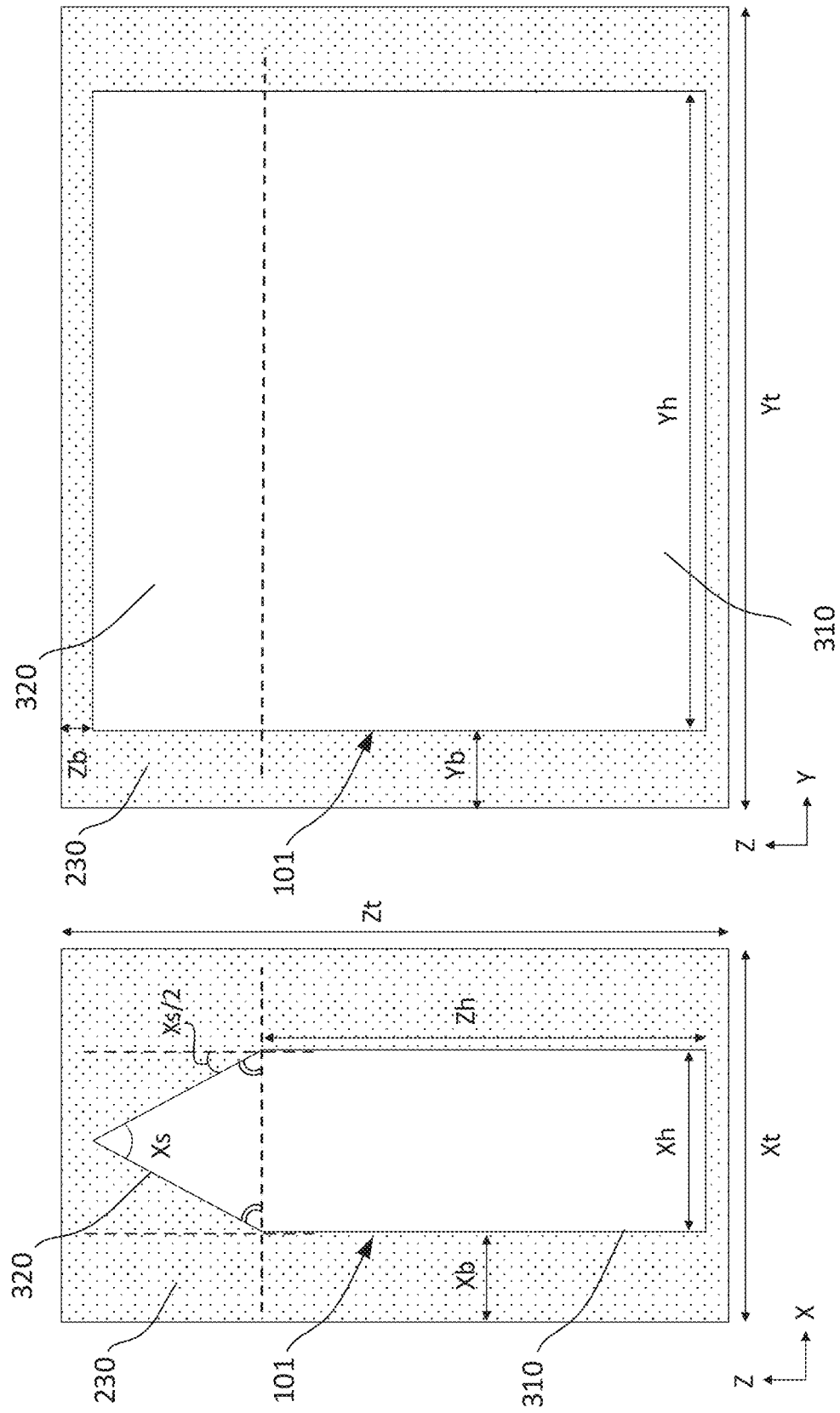

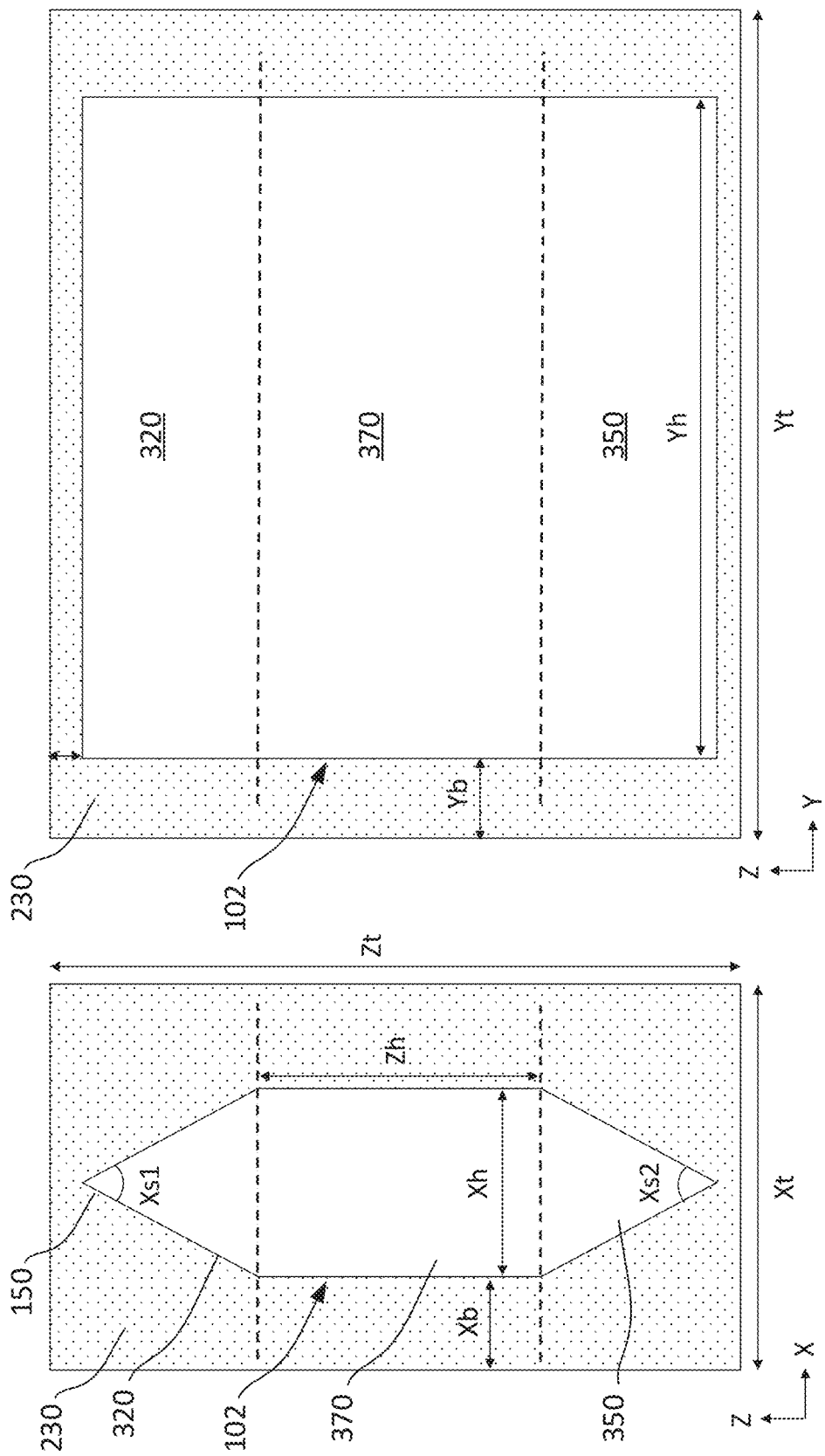

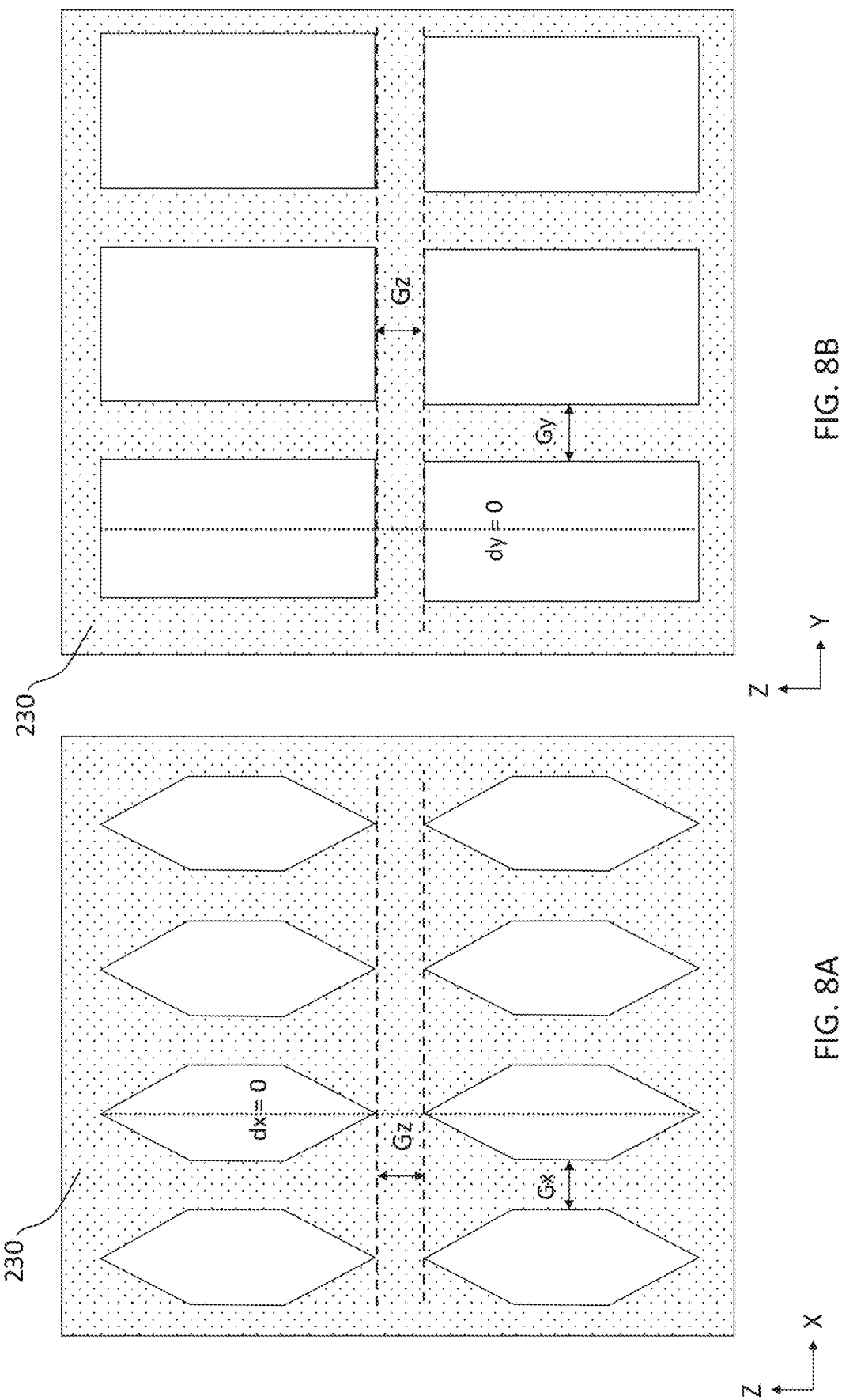

METHOD FOR ADDITIVE MANUFACTURING AN OBJECT

RELATED APPLICATIONS

This application is a National Phase of PCT Patent Application No. PCT/IL2020/050379 having International filing date of Mar. 29, 2020, which claims the benefit of priority under 35 USC § 119(e) of U.S. Provisional Patent Application No. 62/825,047 filed on Mar. 28, 2019. The contents of the above applications are all incorporated by reference as if fully set forth herein in their entirety.

FIELD AND BACKGROUND OF THE INVENTION

The present invention, in some embodiments thereof, relates to a method for additive manufacturing an object, and more particularly, but not exclusively, to a method for additive manufacturing an object comprising structured air pocket.

Additive manufacturing (AM) is a technology enabling fabrication of arbitrarily shaped objects directly from computer data via additive formation steps. The basic operation of any AM system consists of slicing a three-dimensional computer model into thin cross sections, translating the results into two-dimensional position data and feeding the data to control equipment of an additive manufacturing system to fabricate a three-dimensional object in a layer-wise manner according to the data.

Inkjet printing systems are one group of AM systems. In inkjet printing systems, the building material includes a model material (also referred to as "modeling material"), which is jetted to produce the desired object. In some inkjet printing systems, the model material is a photopolymer material that is cured with ultraviolet (UV) light after it is jetted. The photopolymer material may have a composition which, after curing, gives a solid material with mechanical properties that permit the building and handling of the three-dimensional object being built. The solidified material may be rigid, or may have elastic properties.

The building material may also include a support material. Support material may provide temporary support to specific regions of the object during building and assures adequate vertical placement of subsequent object layers. Optionally, supporting structure geometries may be defined by the host computer and built with the support material utilizing the same deposition techniques by which the modeling material is dispensed. The support material is configured to be removed after the object is completed.

SUMMARY OF THE INVENTION

According to an aspect of some embodiments of the present invention there is provided a method for fabricating a 3D object. The method includes incorporating one or more structured air pockets, e.g. air voids within the 3D object without compromising an outer appearance of the object. In some examples, the structured air pocket is included in the object to reduce its weight and/or to reduce an amount of material needed to form the object. Optionally, the cost for fabricating the object is reduced based on reducing the amount of material used to form the object. In some example embodiments, the structured air pocket is configured to alter and/or provide a desired mechanical property to the object. Optionally, the mechanical property imparted to the object may be selectively directional. For example, flexibility or deformability of the object may be increased in at least one direction based on the one or more structured air pockets in the object.

According to an aspect of some example embodiments, there is provided an additive manufacturing method for printing an object, the method comprising: receiving three-dimensional printing data corresponding to the object; defining an internal region of the object to be formed with a structured air pocket; and printing the object with an additive manufacturing system, wherein said object comprises an internal region formed with a structured air pocket.

Optionally, printing the object is carried out continuously without interrupting the printing sequence.

Optionally, the object is printed with at least one modeling material.

Optionally, the object is printed with at least a first modeling material and a second modeling material, said first and second modeling materials being different in composition.

Optionally, the structured air pocket comprises a floor and an overhang.

Optionally, the overhang is configured to be self-supporting.

Optionally, the overhang has an angle of 5°-15° or 5°-10°.

Optionally, the overhang is formed along one of a scan direction and a cross scan direction.

Optionally, the method includes defining a geometry of the floor to reflect light radiation towards the overhang.

Optionally, the structured air pocket has a diamond shaped cross-section along the one of the scan direction and the cross scan direction.

Optionally, the structured air pocket has a hexagonal shape along the one of the scan direction and the cross scan direction.

Optionally, the structured air pocket has a rectangular or a square cross-section along the other one of the scan direction and the cross scan direction.

Optionally, the printing resolution is greater in the scan direction and wherein the overhang is formed along the scan direction.

Optionally, the internal region is defined to be formed with a lattice of structured air pockets.

Optionally, the lattice is a staggered lattice.

Optionally, the additive manufacturing system is an inkjet system.

Optionally, the at least one modeling material is a photopolymer material.

Optionally, the overhang is built with a modeling material that includes a higher concentration of photo-initiator than the modeling material used outside the internal region.

Optionally, the modeling material that includes a higher concentration of photo-initiator comprises a photo-initiator load greater than 5% of the total weight.

Optionally, the structured air pocket includes a floor built with a modeling material configured to reflect ultraviolet light.

Optionally, the modeling material is a white material comprising TiO2 particles.

Optionally, the method includes filling the structured air pocket with a liquid during printing the object.

Optionally, the liquid is water.

Optionally, the method includes reducing the concentration of oxygen in the environment of the object being printed.

According to an aspect of some example embodiments, there is provided an object built by an additive manufacturing system, the object comprising an internal region with a structured air pocket.

Optionally, the object comprises a modeling material and air.

Optionally, the modeling material is a photopolymer.

Optionally, the object comprises at least two photopolymers, and wherein one of the photopolymers is flexible.

Optionally, the structured air pocket comprises an overhang forming an angle of 5°-15° or 5°-10°.

Optionally, the structured air pocket has a first cross-sectional shape in a first plane and a second cross-sectional shape in a second plane, the second plane being perpendicular to the first plane.

Optionally, the first cross-sectional shape is a diamond or a hexagon shape.

Optionally, the second cross-sectional shape is a rectangle or a square shape.

Optionally, the internal region includes a lattice of structured air pockets.

Optionally, the lattice is a staggered lattice.

Optionally, the overhang is printed at least partially with a material including a high concentration of photo-initiator.

Optionally, the concentration of photo-initiator is greater than 5% of the total weight of the material.

Optionally, the structured air pocket includes a floor at least partially formed with a material configured to reflect ultraviolet light.

Optionally, the reflective material is a white material comprising $TiO_2$ particles.

Optionally, the structured air pocket is filled with a liquid.

Optionally, the liquid is water.

According to an aspect of some example embodiments, there is provided an additive manufacturing (AM) system comprising: a dispensing head including an array of nozzles configured to selectively dispense a modeling material; a non-transitory computer readable medium on which a computer program product is stored, wherein the computer program product is configured to receive three-dimensional printing data corresponding to an object, and is further configured to define an internal region of the object to be manufactured with a structured air pocket; and a controller configured to control selective dispensing of the modeling material through the array of nozzles to manufacture an object based on the three-dimensional printing data and the defined internal region.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings (including images). With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-D are schematic illustrations of an additive manufacturing system in accordance with some embodiments of the invention;

Figures 7A, 7B:
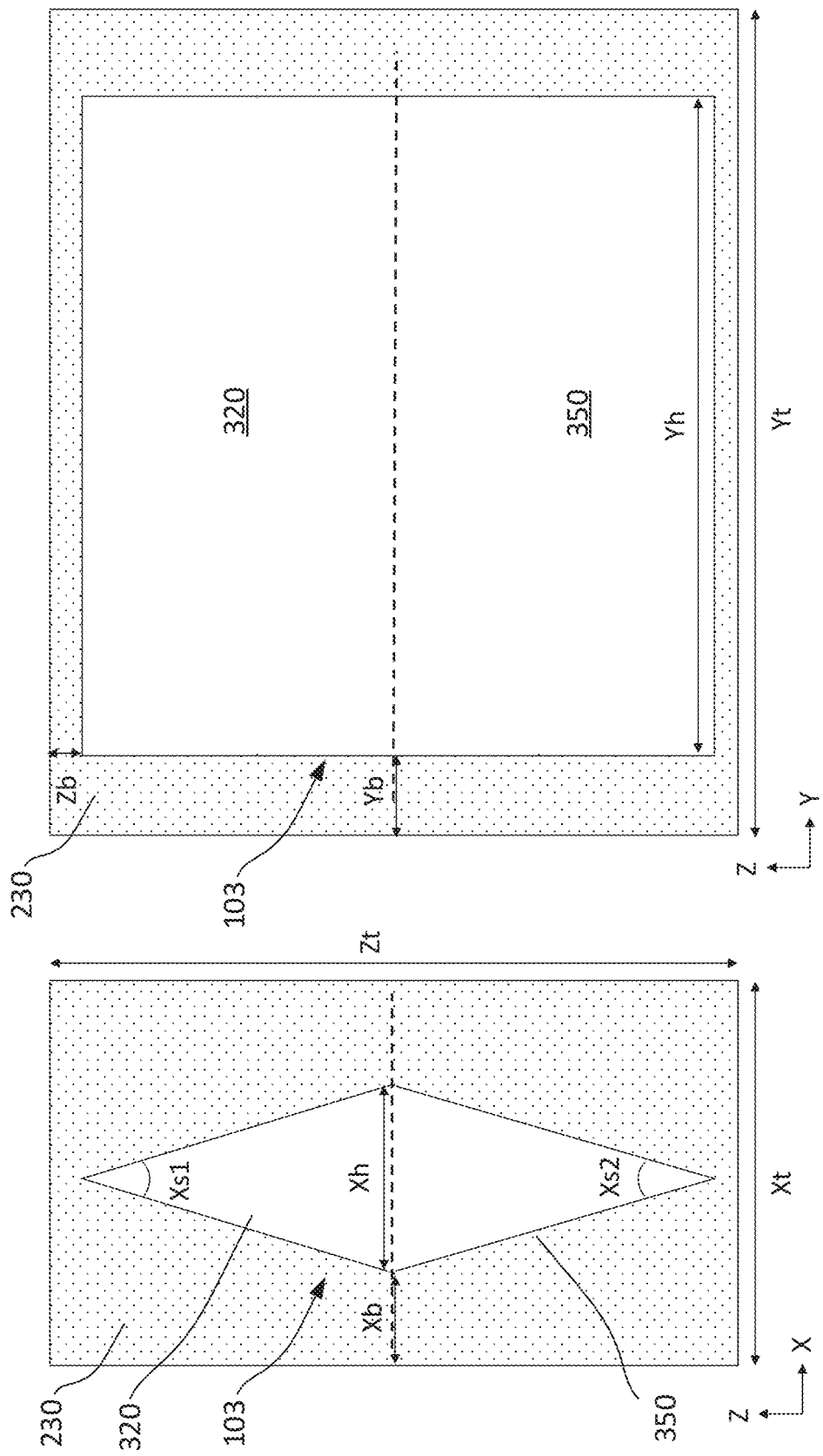
Figures 9A, 9B:
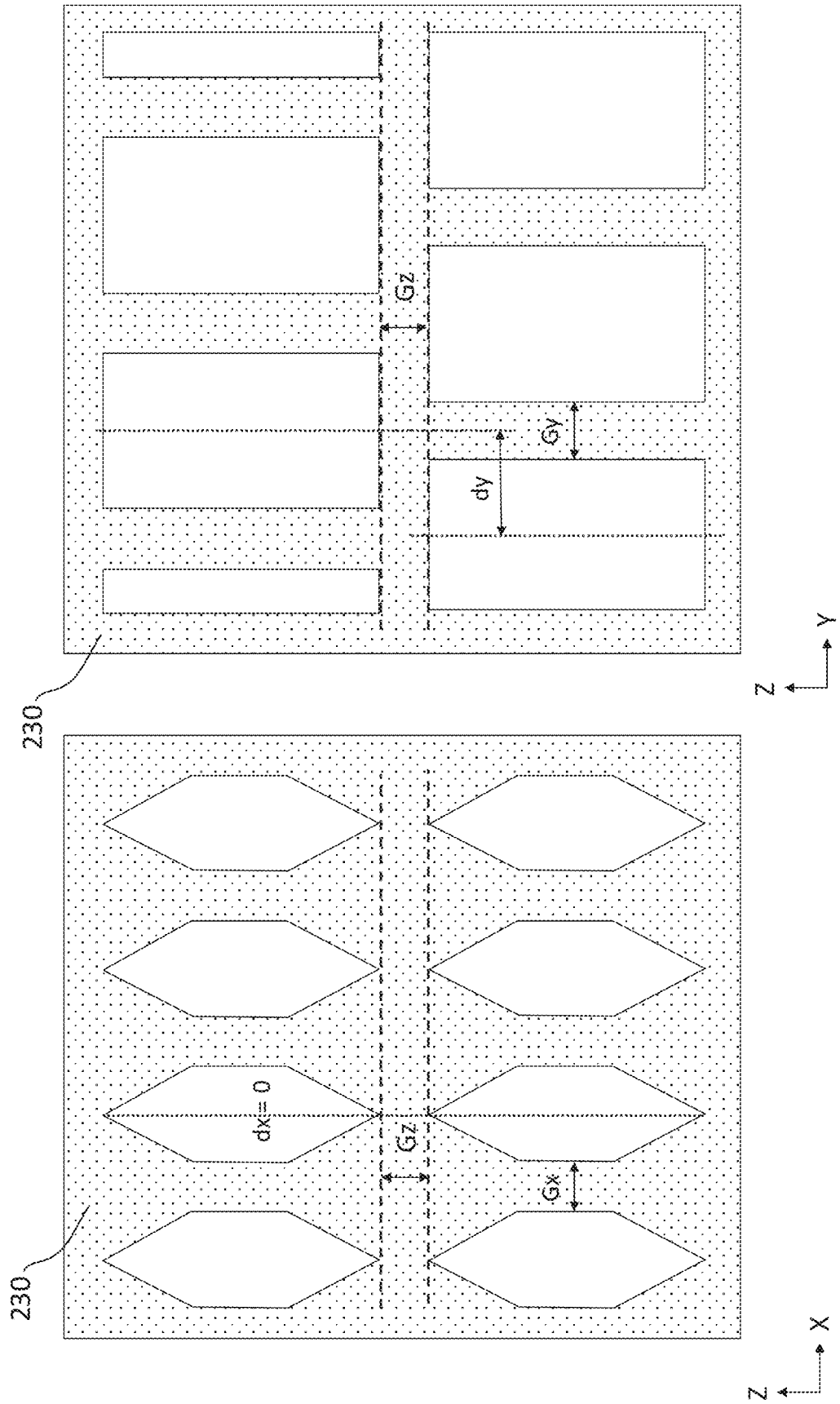
Figure 10A:
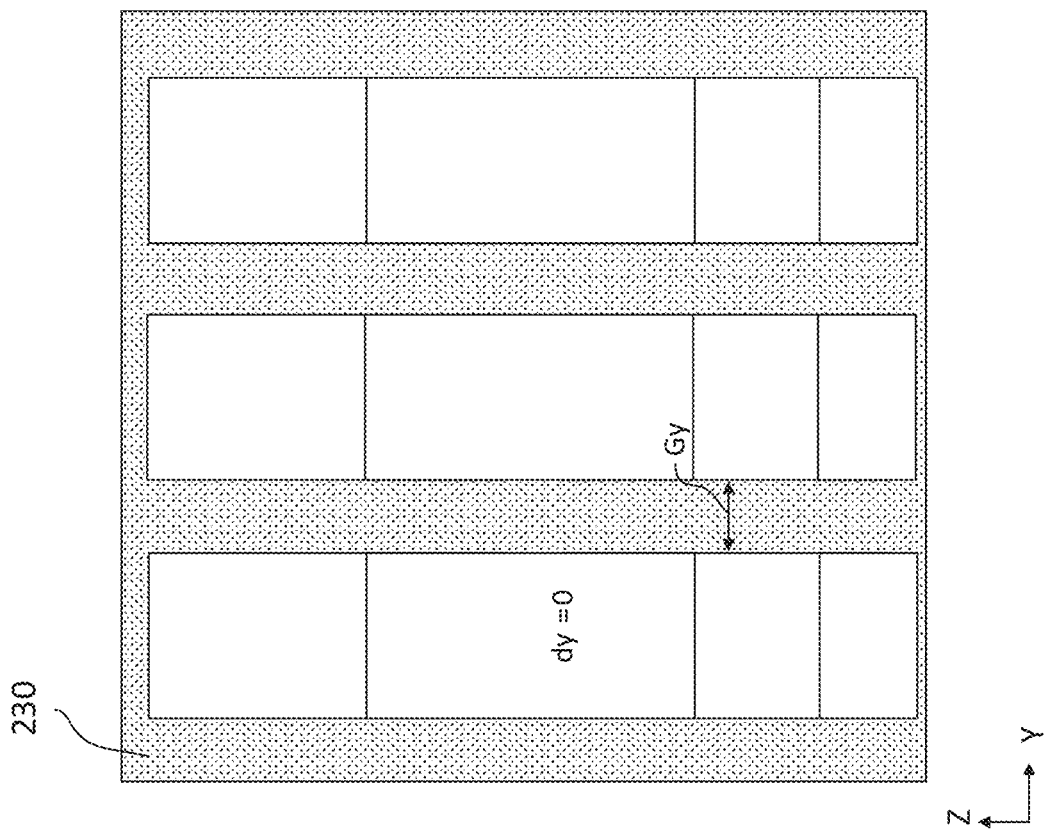
Figure 10B:
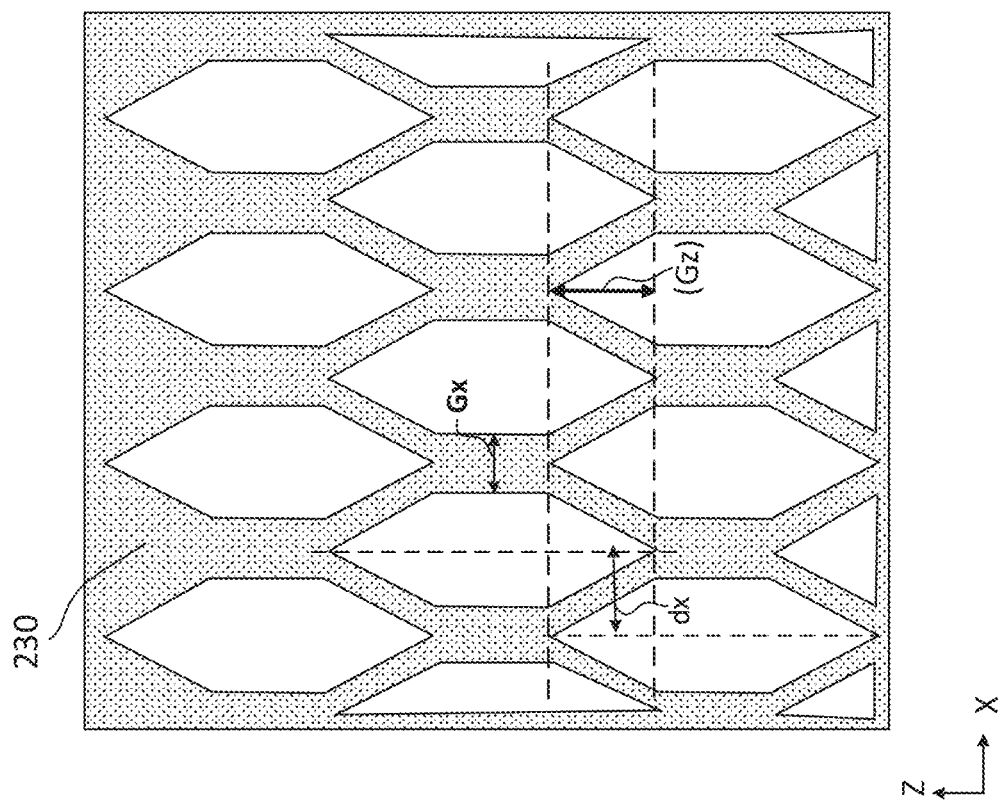
Figures 11A, 11B:
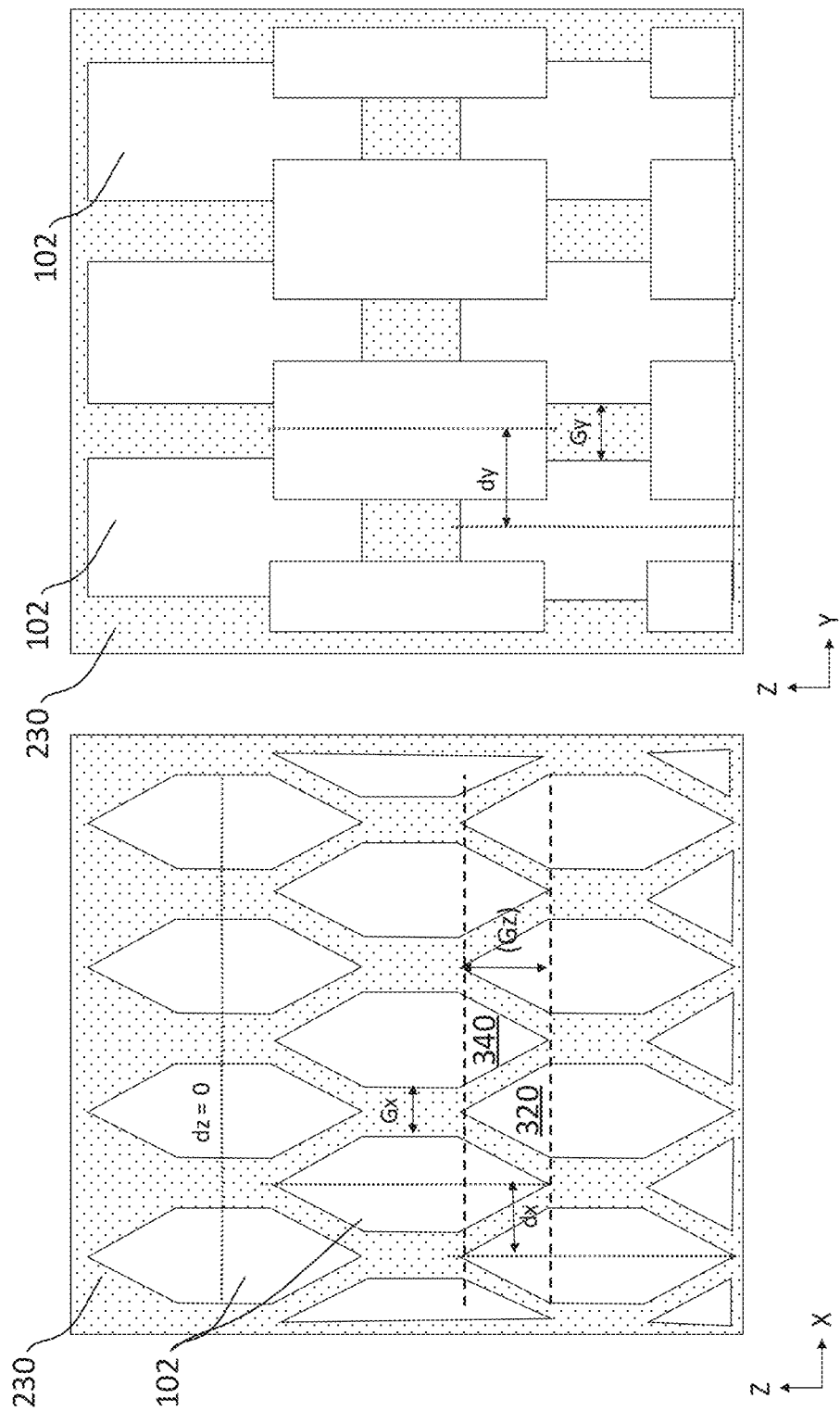
Figure 12A:
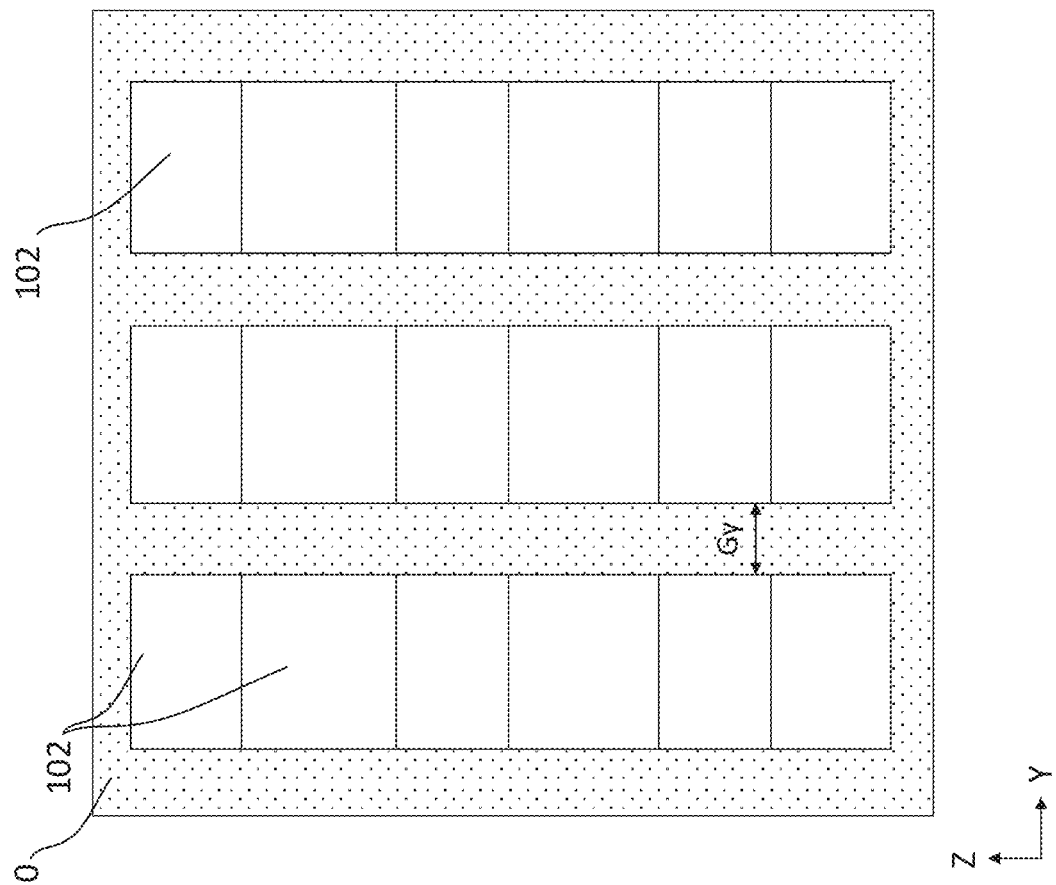
Figure 12B:
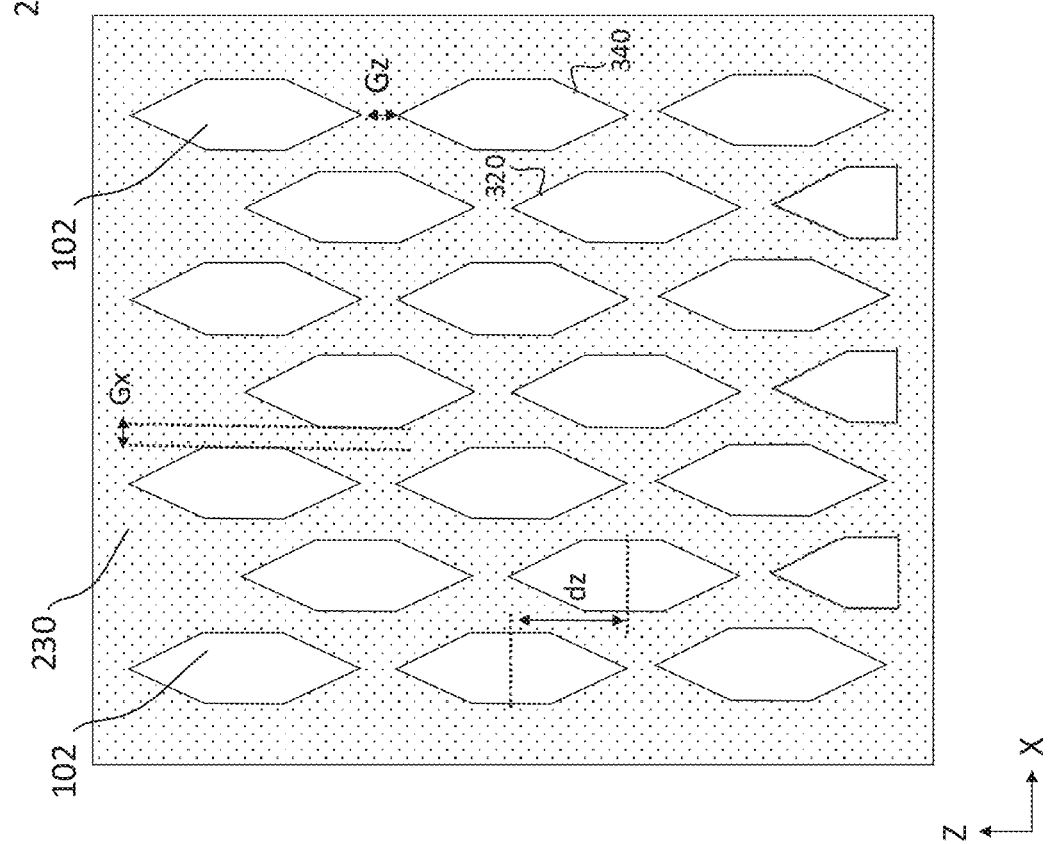
Figures 13, 14:
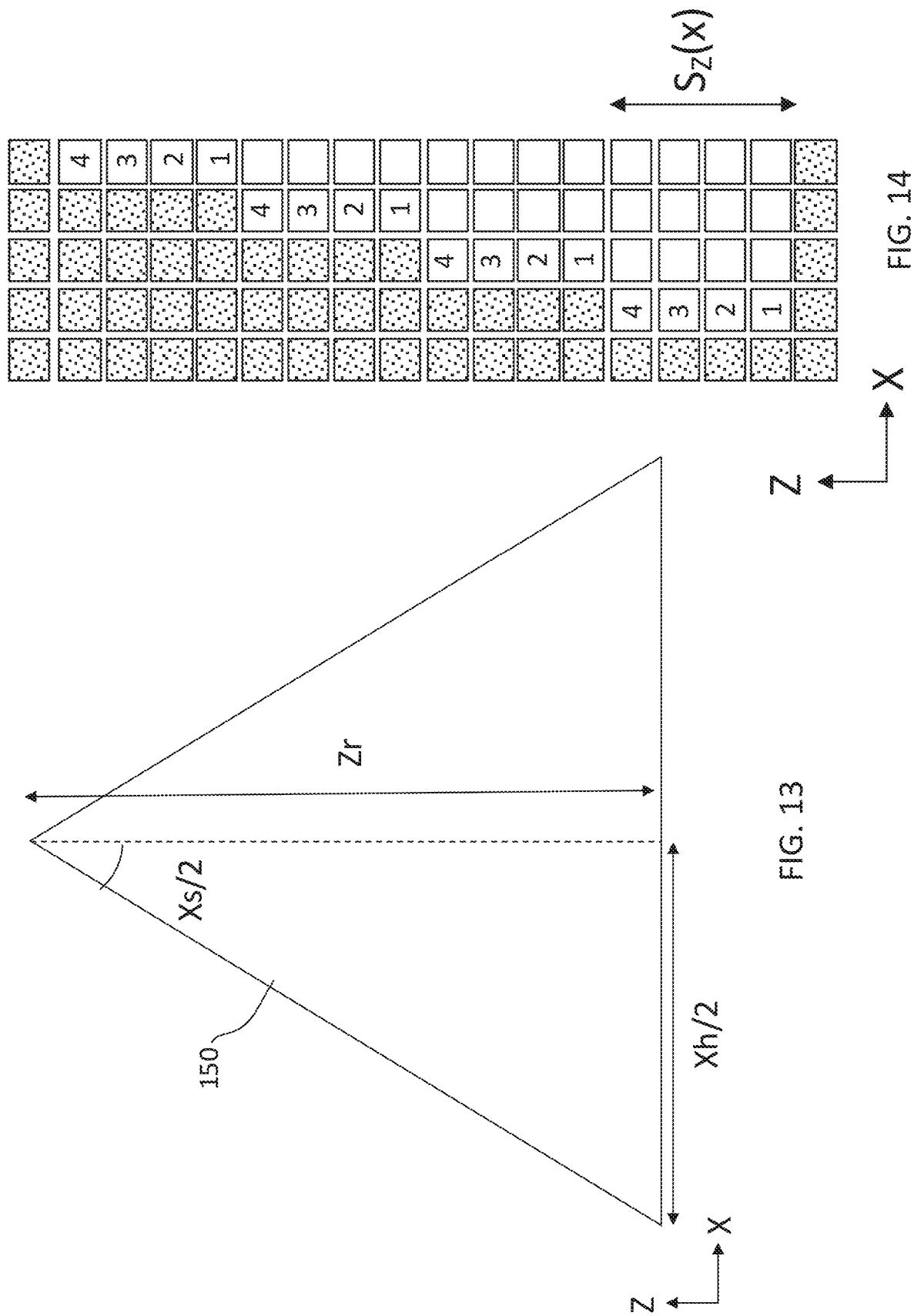
Figure 17A:
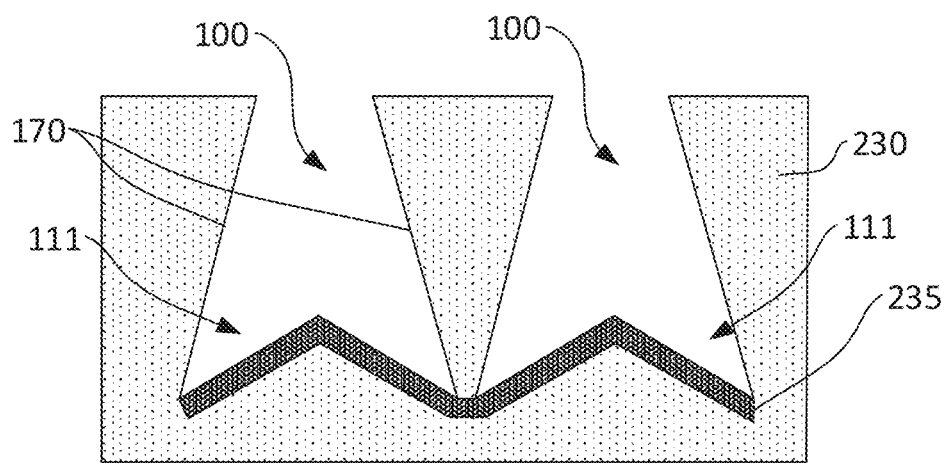
Figure 17B:
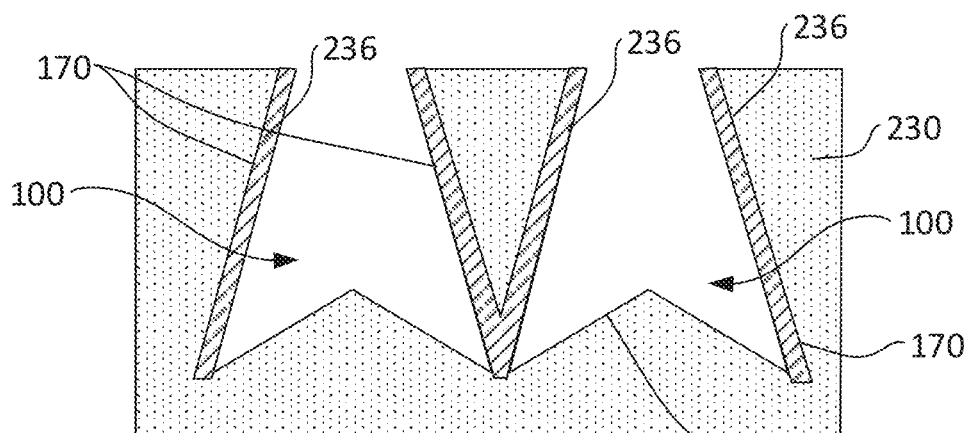
Figure 17C:
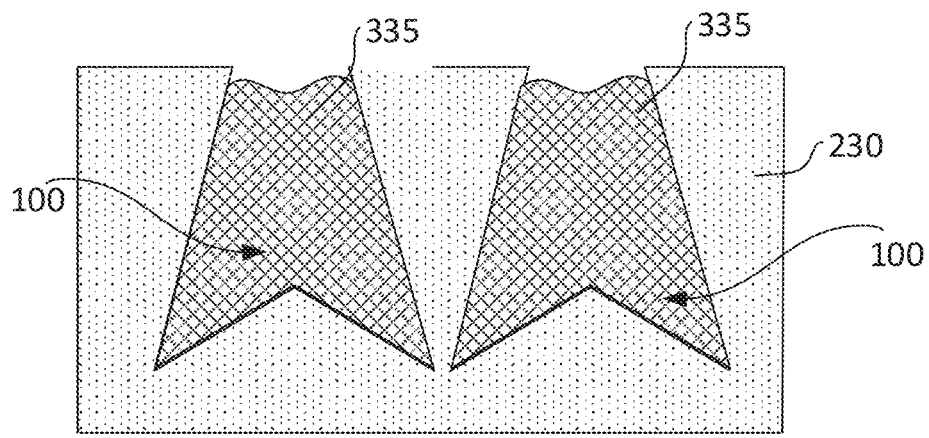
Figure 18:
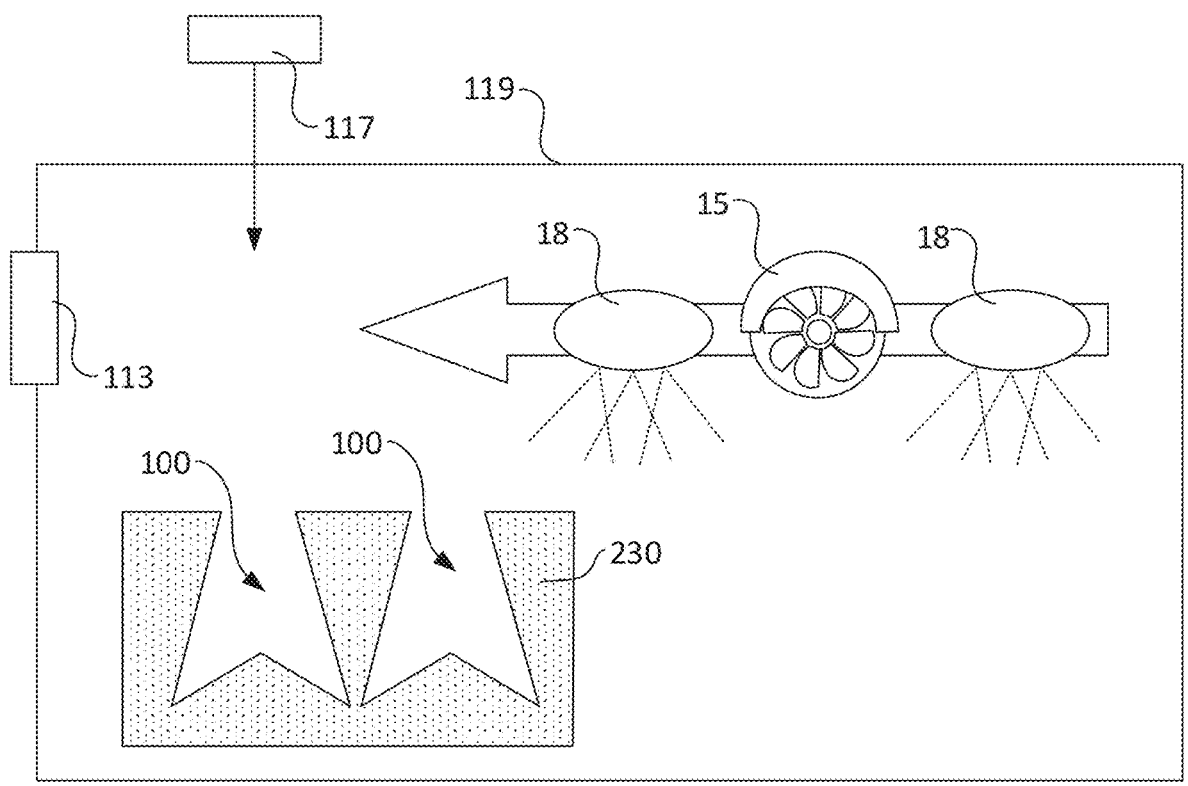
Figure 19:
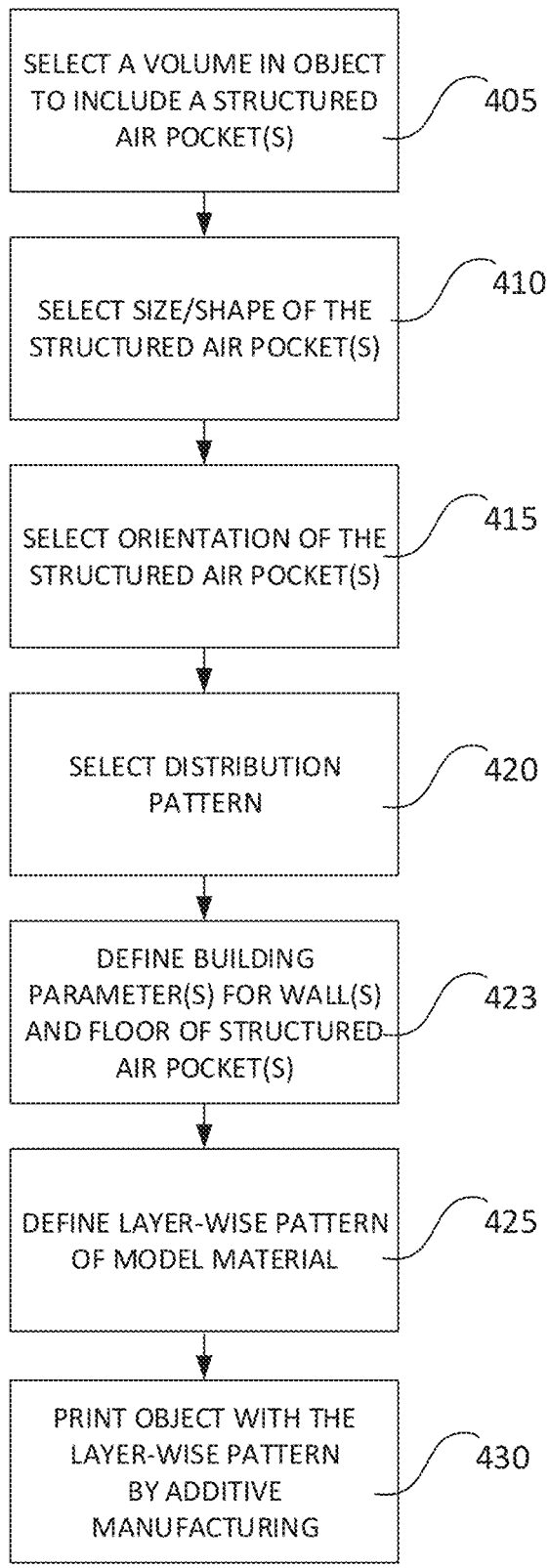

FIGS. 4A, 4B, 4C and 4D provide an image of an example object and schematic cross-sectional views showing three example constructions for an interior of the object formed by additive manufacturing, all in accordance with some example embodiments;

FIGS. 5A and 5B are front and side schematic cross-sectional views of one example structured air pocket formed within an object during additive manufacturing in accordance with some example embodiments;

FIGS. 6A and 6B are front and side schematic cross-sectional views of another example structured air pocket formed within an object during additive manufacturing in accordance with some example embodiments;

FIGS. 7A and 7B are front and side schematic cross-sectional views of a yet another example structured air pocket formed within an object during additive manufacturing in accordance with some example embodiments;

FIGS. 8A and 8B are front and side schematic cross-sectional views of an example lattice of structured air pockets symmetrically aligned in both a front and side plane in accordance with some example embodiments;

FIGS. 9A and 9B are front and side schematic cross-sectional views of an example lattice of structured air pockets that is angled with respect to a side plane in accordance with some example embodiments;

FIGS. 10A and 10B are front and side schematic cross-sectional views of an example lattice of structured air pockets that is staggered in a front in accordance with some example embodiments;

FIGS. 11A and 11B are front and side schematic cross-sectional views of an example lattice of structured air pockets that is staggered in both a front and a side plane in accordance with some example embodiments;

FIGS. 12A and 12B are front and side schematic cross-sectional views of an another example lattice of structured air pockets that is staggered in a front plane in accordance with some example embodiments;

FIG. 13 is a schematic drawing of a tapered tip in accordance with some example embodiments;

FIG. 14 is a schematic drawing of showing an example construction of a portion of a structured air pocket in pixel resolution in accordance with some example embodiments;

FIGS. 15A, 15B, 15C and 15D are front schematic cross-sectional views of other example structured air pockets formed within an object by additive manufacturing in accordance with some example embodiments;

FIGS. 16A, 16B, 16C and 16D are four example structured air pocket floor geometries configured to enhance curing of modeling material forming an overhang around a structured air pocket, all in accordance with some example embodiments;

FIGS. 17A, 17B and 17C are three example construction modifications configured to enhance curing of modeling material forming an overhang around a structured air pocket, all in accordance with some example embodiments;

FIG. 18 is a plurality of additional devices that may be used to enhance curing of modeling material forming an overhang around a structured air pocket, all in accordance with some example embodiments;

FIG. 19 is a simplified flow chart of an example method of printing an object with one or more structured air pockets by an additive manufacturing method according with some example embodiments; and FIGS. 20A, 20B, 20C and 20D are images of an example object including a lattice of structured air pockets, the object formed by an additive manufacturing method according with some example embodiments.

DESCRIPTION OF SPECIFIC EMBODIMENTS OF THE INVENTION

The present invention, in some embodiments thereof, relates to an additive manufacturing method for forming a structured air pocket within an object and, more particularly, but not exclusively, to the object formed with the additive manufacturing method.

The terms "air pocket/s" and "air void/s" referred to herein are used interchangeably.

At times it is desirable to reduce a weight of an object being fabricated by an AM process and/or to reduce cost of the fabrication by using less material. For example, compared to some plastics, objects formed with some known resin material, e.g. photopolymer material in an inkjet printing system tend to be heavy, which may be a drawback for some applications. Furthermore, it may be desirable to reduce the resin consumption per model for the purpose of reducing cost of fabrication as well as for reducing waste. Still further it may be desirable to impart a defined mechanical property to an object being formed. According to some example embodiments, selectively including a lattice of structured air pockets within an interior volume of an object may provide the advantage reducing weight, reducing cost and/or obtaining a desired mechanical property.

Adding structured air pockets within an object during an AM process may be accompanied by difficulties since each layer in the AM process is required to be formed, i.e., supported on a previous layer of material. During fabrication of a structured air pocket, e.g. fabrication of the walls and/or an overhang of the structured air pocket, model material dispensed around or within the structured air pocket, e.g. and which is insufficiently cured may cause the walls of the structured air pocket to collapse into the structured air pocket or otherwise deform, causing deformation of the structured air pocket and/or the object shape. Once such a deformation is formed, many layers may be required to compensate for the deformation created. At times, the layers of model material layered over the structured air pockets may not succeed in fully enclosing the structured air pockets and holes that extend to an outer surface of the object may be formed. In some example embodiments it may be desirable to strengthen the walls of the structured air pocket being formed within an object by increasing curing or polymerization of liquid resin falling around the structured air pocket during its formation.

According to some example embodiments, a three-dimensional object is fabricated with one or more structured air pockets having a pre-defined shape(s). According to some example embodiments, the shape(s) of the one or more structured air pockets is defined to be encapsulated over a pre-defined number of layers with self-supporting walls formed from the surrounding model material. According to some example embodiments, the structured air pockets are formed during the AM process without interrupting the layer-wise deposition of the building material for example, without a need to pause the layer-wise deposition for the purpose of positioning an insert to support a shape of the structured air pocket, e.g. an overhang formed around the air pocket. According to some example embodiments, based on the pre-defined shape, self-supporting walls encapsulating the structured air pocket are configured to withstand weight of material dispensed above them without collapsing. According to some example embodiments, the pre-defined shape of the structured air pocket includes a tapered end, e.g. edge or point, in the vertical direction such that the surrounding modeling material is configured to gradually close the structured air pocket over a plurality of layers. Optionally, the tapered edge forms a wedge. Optionally, while a roof of the structured air pocket is tapered, a base of the structured air pocket may be cuboid, rounded, and/or tapered. For example, the structured air pocket may have a cuboid base capped with a triangular shaped roof. The tapering angle (or wedge angle) at the upper tapered end and number of layers required to close the structured air pocket may be defined based on parameters of the model material, as well as parameters of the fabricating process. Optionally, the tapered end is defined to have an angle that is less than 20°, e.g. an angle of 10°-15°.

According to some example embodiments, one or more parameters for forming the structured air pocket may be defined to boost, enhance and/or expedite polymerization or hardening of material deposited to form an overhang in the structured air pocket during the AM process. Enhancing polymerization or hardening may prevent the dispensed material, e.g. liquid resin, from falling into structured air pocket and/or may prevent deformation and/or collapsing of the overhang into the structured air pocket.

Optionally, a shape of a structured air pocket floor is defined to reflect radiation received from the curing radiation source toward the overhang. The floor may be defined to have a concave, convex or jagged geometry. Optionally, alternatively or additionally, a floor and/or the walls of the structured air pocket is formed with a reflective material, e.g. white material optionally including fillers, e.g. $TiO_2$ particles. The enhanced radiation due to reflection may expedite polymerization of the overhang and thereby prevent its collapse or dripping of uncured material into the structured air pocket.

Optionally, alternatively or additionally, an overhang of the structured air pocket is formed with model material comprising a relatively high amount of photo-initiators, e.g. greater than that in other portions of model material, to enhance polymerization of the model material forming the overhang. In some example embodiments, the structured air pocket may be filled with a liquid, e.g. water, during construction. Optionally, alternatively or additionally, the liquid may prevent oxygen inhibition (e.g., inhibition of polymerization due to presence of oxygen) within the air pocket and/or around the overhang and thereby enhance polymerization of the model material.

In some example embodiments, the AM apparatus includes dedicated devices to enhance polymerization of the modeling material used to form the air pocket, e.g. the overhang. Optionally, a cooling unit or an additional curing unit may be added to the AM apparatus to enhance polymerization. Optionally, oxygen concentration in an enclosure of the AM apparatus may be reduced to enhance polymerization of the building material.

In some example embodiments, when the AM system provides a higher resolution (dots per inch (DPI)) in one of the scan direction or cross scan direction, the tapering is formed in a direction with the higher printing resolution. For example, a cross-section of the structured air pocket in the plane defined by an axis that provides the higher printing resolution (the scan or cross scan direction) and the vertical axis may include the triangular shaped roof. Optionally, a cross-section of the structured air pocket in the plane defined by an axis that provides the lower printing resolution (the scan or cross scan direction) and the vertical axis has a rectangular or square shape.

According to some example embodiments, an inner volume of an object is formed with a lattice of structured air pockets. Optionally, the lattice is defined to be staggered. Optionally, the staggering increases the number of structured air pockets that may be fitted inside a defined volume of the object.

According to some example embodiments, a lattice of structured air pockets is defined and positioned to impart a desired mechanical property to a defined portion of the object. Optionally, the lattice of structured air pockets may increase the deformability and/or flexibility of an object that is formed with an elastic or bendable material. Optionally, a density of the lattice of structured material may be selectively varied to provide different degrees of flexibility and/or deformability at different locations in the object.

The method and system of the present embodiments manufacture three-dimensional objects based on computer object data in a layer-wise manner by forming a plurality of layers in a configured pattern corresponding to the shape of the objects. The computer object data can be in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

The term "object" as used herein refers to a whole object or a part thereof.

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention the AM comprises three-dimensional printing, more preferably three-dimensional inkjet printing. In these embodiments a building material formulation is dispensed from a dispensing head having an array of nozzles to dispense building material formulation in layers on a tray. The AM apparatus thus dispenses building material formulation in target locations which are to be occupied and leaves other target locations void. The apparatus typically includes a plurality of dispensing heads, each of which can be configured to dispense a different building material formulation. Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in additive manufacturing and which is able to form a three-dimensional object on its own, i.e., without having to be mixed or combined with any other substance.

The final three-dimensional object is made of the modeling material formulation or a combination of modeling material formulations or modeling and support material formulations or modification thereof (e.g., following curing). All these operations are well-known to those skilled in the art of solid freeform fabrication.

In some exemplary embodiments of the invention an object is manufactured by dispensing two or more different modeling material formulations, each material formulation from a different dispensing head or different array of dispensing head nozzles of the AM. The material formulations are optionally and preferably dispensed in layers during the same pass of the printing heads. The material formulations and combination of material formulations within the layer are selected according to the desired properties of the object.

Figure 1A:
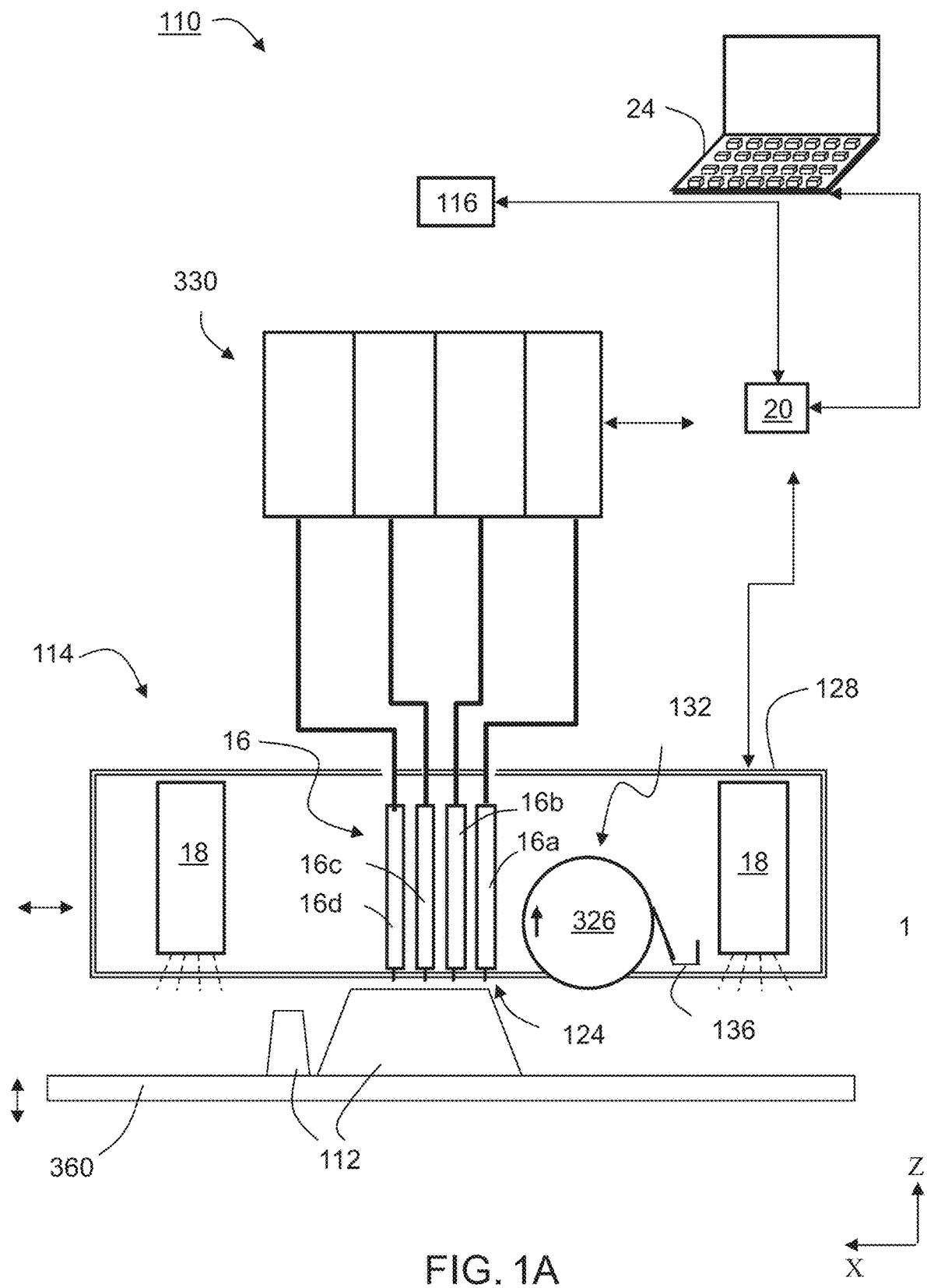
Figure 2A:
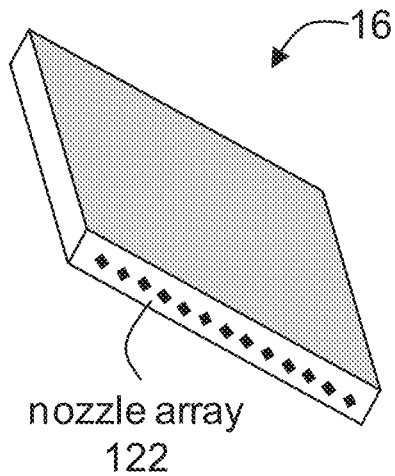
FIGS. 2A-2C are schematic illustrations of printing heads in accordance with some embodiments of the present invention.
Figure 2B:
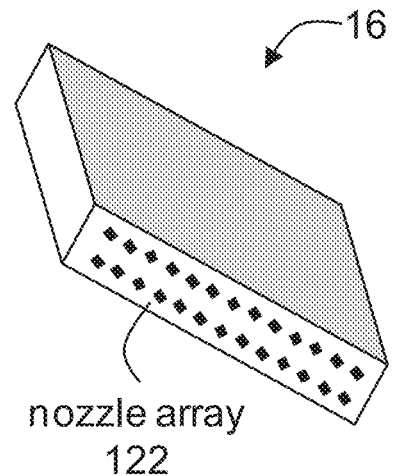
Figure 2C:
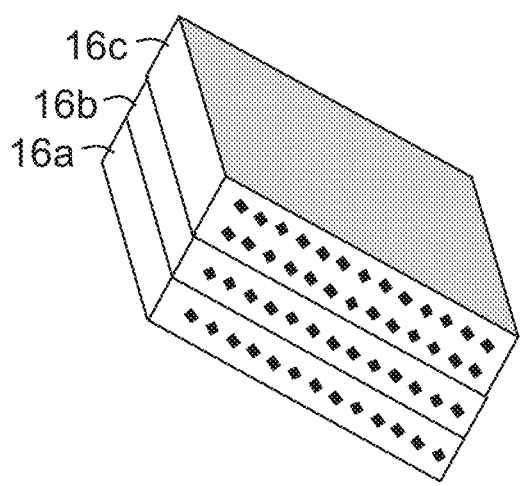

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of dispensing heads. Each head preferably comprises an array of one or more nozzles 122, as illustrated in FIGS. 2A-C described below, through which a liquid building material formulation 124 is dispensed.

Preferably, but not obligatorily, apparatus 114 is a three-dimensional printing apparatus, in which case the dispensing heads are printing heads, and the building material formulation is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material formulation deposition apparatus.

Each dispensing head is optionally and preferably fed via one or more building material formulation reservoirs which may optionally include a temperature control unit (e.g., a temperature sensor and/or a heating device), and a material formulation level sensor. Optionally, more than one dispensing head is fed via the same material formulation reservoir, e.g. two dispensing heads may share the same material formulation reservoir to dispense the same material, or two different materials via a single, but internally separated reservoir. To dispense the building material formulation, a voltage signal is applied to the dispensing heads to selectively dispense droplets of material formulation via the dispensing head nozzles, for example, as in piezoelectric inkjet printing technology. The dispensing rate of each head depends on the number of nozzles, the type of nozzles and the applied voltage signal rate (frequency). Another example includes thermal inkjet printing heads. In these types of heads, there are heating elements in thermal contact with the building material, for heating the building material to form gas bubbles therein, upon activation of the heating elements by a voltage signal. The gas bubbles generate pressures in the building material, causing droplets of building material to be ejected through the nozzles. Piezoelectric and thermal printing heads are known to those skilled in the art of solid freeform fabrication. Such dispensing heads are known to those skilled in the art of solid freeform fabrication.

Preferably, but not obligatorily, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative example of FIG. 1A, four dispensing heads 16a, 16b, 16c and 16d are illustrated. Each of heads 16a, 16b, 16c and 16d has a nozzle array. In this Example, heads 16a and 16b can be designated for modeling material formulation/s and heads 16c and 16d can be designated for support material formulation. Thus, head 16a can dispense one modeling material formulation, head 16b can dispense another modeling material formulation and heads 16c and 16d can both dispense support material formulation. In an alternative embodiment, heads 16c and 16d, for example, may be combined in a single head having two nozzle arrays for dispensing support material formulation. In a further alternative embodiment any one or more of the printing heads may have more than one nozzle arrays for dispensing more than one material formulation, e.g. two nozzle arrays for dispensing two different modeling material formulations or a modeling material formulation and a support material formulation, each formulation via a different array or number of nozzles.

Yet it is to be understood that it is not intended to limit the scope of the present invention and that the number of modeling material formulation dispensing heads (modeling heads) and the number of support material formulation dispensing heads (support heads) may differ. Generally, the number of modeling heads, the number of support heads and the number of nozzles in each respective head or head array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for a are from about 0.6 to about 1.5.

As used herein the term "about" refers to ±10%.

For example, for a=1, the overall dispensing rate of support material formulation is generally the same as the overall dispensing rate of the modeling material formulation when all modeling heads and support heads operate.

In a preferred embodiment, there are M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

Apparatus 114 can further comprise a solidifying device 324 which can include any device configured to emit light, heat or the like that may cause the dispensed material formulation to harden. For example, solidifying device 324 can comprise one or more radiation sources, which can be, for example, an ultraviolet or visible or infrared lamp, or other sources of electromagnetic radiation, or electron beam source, depending on the modeling material formulation being used. In some embodiments of the present invention, solidifying device 324 serves for curing or solidifying the modeling material formulation.

The dispensing head(s) and radiation source(s) are preferably mounted in a frame or block 128 which is preferably operative to reciprocally move over a tray 360, which serves as the working surface. In some embodiments of the present invention the radiation sources are mounted in the block such that they follow in the wake of the dispensing heads to at least partially cure or solidify the material formulations just dispensed by the dispensing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material formulation generated during leveling. Waste collection device 136 may comprise any mechanism that delivers the material formulation to a waste tank or waste cartridge.

In use, the dispensing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the dispensing heads of unit 16 is followed by the curing of the modeling material formulation(s) by radiation source 126. In the reverse passage of the heads, back to their starting point for the layer of material just dispensed, an additional dispensing of building material formulation may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layer-wise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material formulation supply system 330 which comprises the building material formulation containers or cartridges and supplies a plurality of building material formulations to fabrication apparatus 114.

A control unit 340 controls fabrication apparatus 114 and optionally and preferably also supply system 330. Control unit 340 typically includes an electronic circuit configured to perform the controlling operations. Control unit 340 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, control unit 340 controls the voltage applied to each dispensing head or nozzle array and the temperature of the building material formulation in the respective printing head.

Once the manufacturing data is loaded to control unit 340 it can operate without user intervention. In some embodiments, control unit 340 receives additional input from the operator, e.g., using data processor 154 or using a user interface 116 communicating with control unit 340. User interface 116 can be of any type known in the art, such as, but not limited to, a keyboard, a touch screen and the like. For example, control unit 340 can receive, as additional input, one or more building material formulation types and/or attributes, such as, but not limited to, color, characteristic distortion and/or transition temperature, viscosity, electrical property, magnetic property. Other attributes and groups of attributes are also contemplated.

Figure 1B:
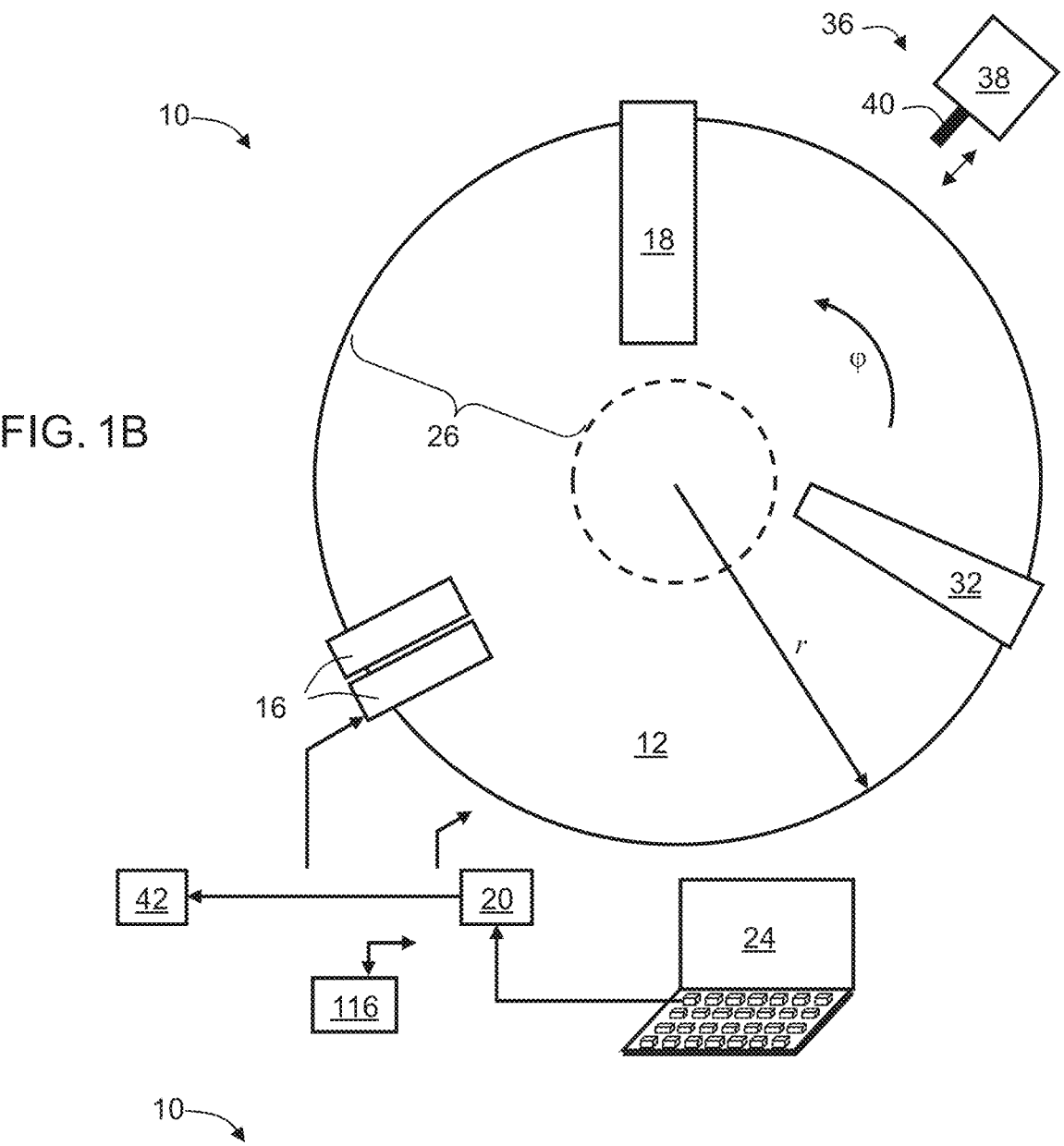
Figure 1C:
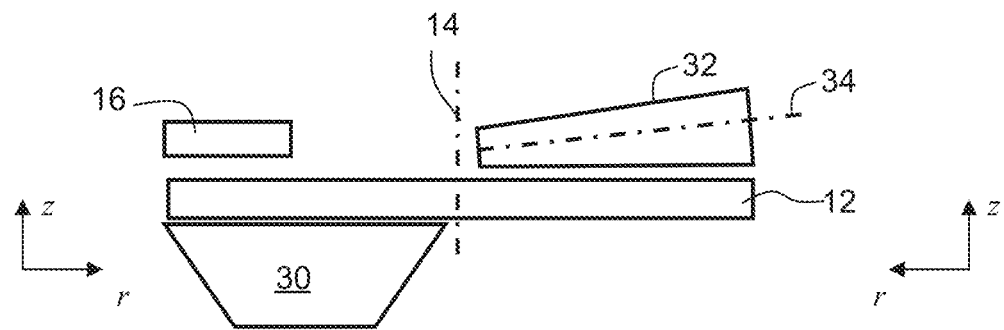
Figure 1D:
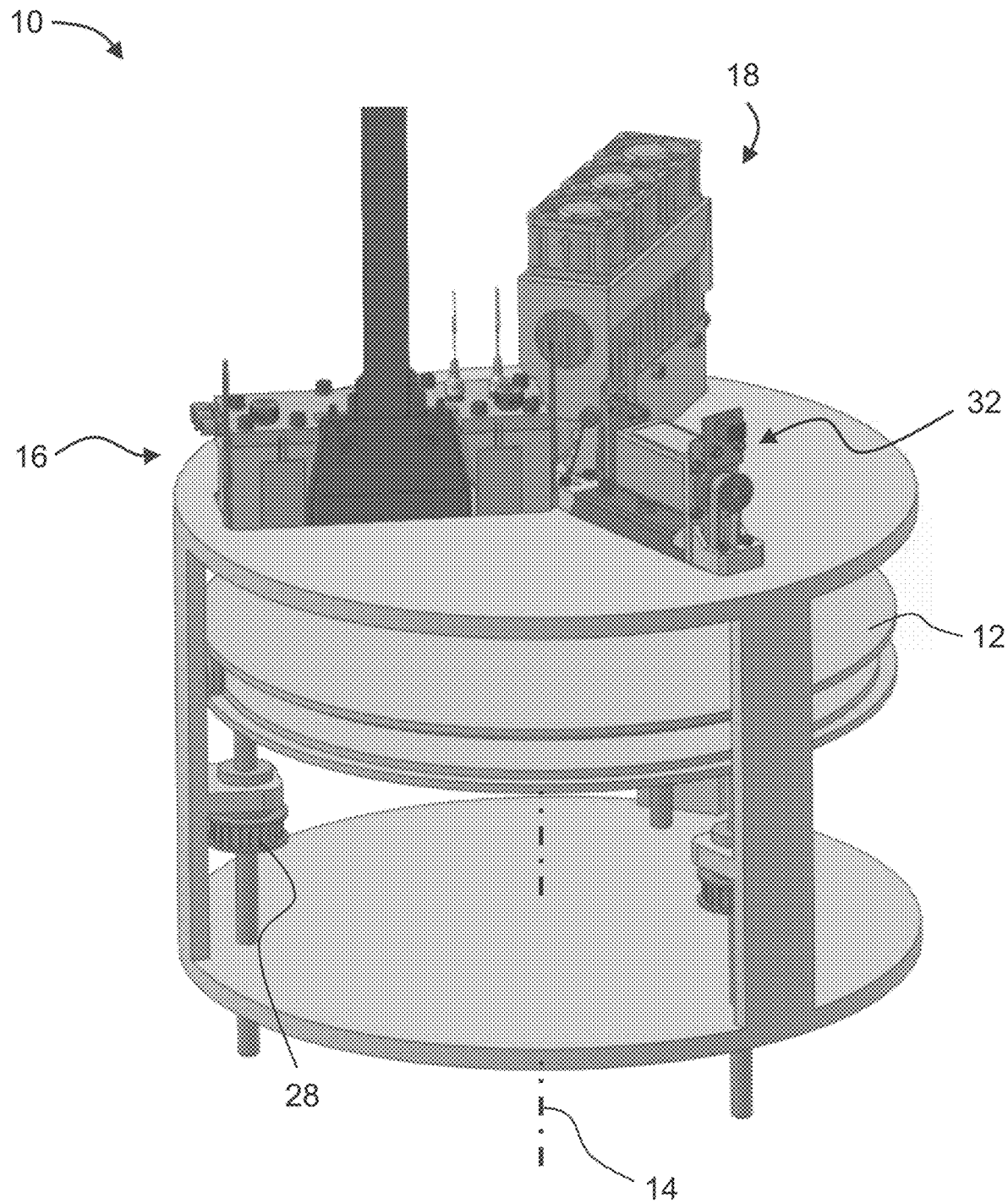

Another representative and non-limiting example of a system 10 suitable for AM of an object according to some embodiments of the present invention is illustrated in FIG. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having a plurality of separated nozzles. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While some embodiments of system 10 are described below with a particular emphasis to configuration (i) wherein the tray is a rotary tray that is configured to rotate about vertical axis 14 relative to heads 16, it is to be understood that the present application contemplates also configurations (ii) and (iii) for system 10. Any one of the embodiments of system 10 described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction $\varphi$, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a building platform for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably parallel to each other.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1-\varphi_2$, and the angle between the linear nozzle arrays of the two heads is also $\varphi_1-\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a stabilizing structure 30 positioned below heads 16 such that tray 12 is between stabilizing structure 30 and heads 16. Stabilizing structure 30 may serve for preventing or reducing vibrations of tray 12 that may occur while inkjet printing heads 16 operate. In configurations in which printing heads 16 rotate about axis 14, stabilizing structure 30 preferably also rotates such that stabilizing structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, stabilizing structure 30 preferably also moves vertically together with tray 12. In configurations in which the vertical distance is varied by heads 16 along the vertical direction, while maintaining the vertical position of tray 12 fixed, stabilizing structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layer-wise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
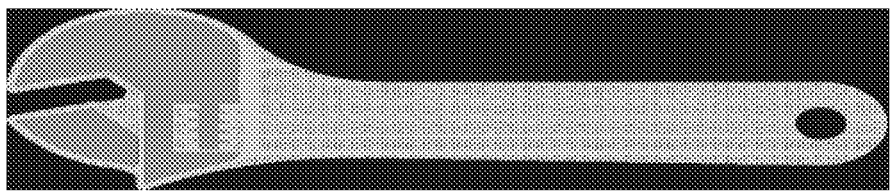
FIGS. 3A and 3B are schematic illustrations demonstrating coordinate transformations in accordance with some embodiments of the present invention.
Figure 3B:
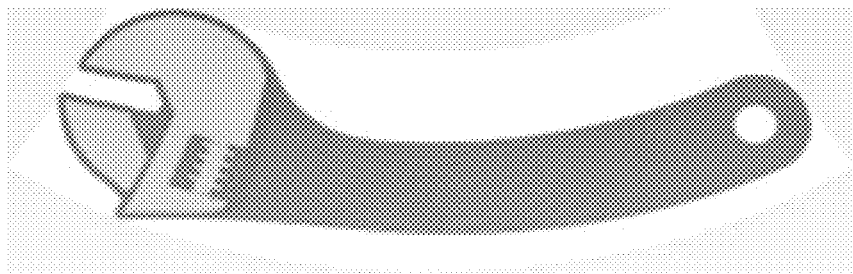

The transformation of coordinates allows three-dimensional printing over a rotating tray. In conventional three-dimensional printing, the printing heads reciprocally move above a stationary tray along straight lines. In such conventional systems, the printing resolution is the same at any point over the tray, provided the dispensing rates of the heads are uniform. Unlike conventional three-dimensional printing, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material formulation in layers, such as to print a three-dimensional object on tray 12.

System 10 optionally and preferably comprises one or more radiation sources 18, which can be, for example, an ultraviolet (UV) or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. Radiation source 18 serves for curing or solidifying the modeling material formulation. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different material formulations from different dispensing heads. These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations may be formed.

The present embodiments thus enable the deposition of a broad range of material formulation combinations, and the fabrication of an object which may consist of multiple different combinations of material formulations, in different parts of the object, according to the properties desired to characterize each part of the object. The object may be fabricated using at least two photopolymers, wherein one of the photopolymer materials is flexible, e.g. having a Shore A value, i.e. hardness, of 27 A or 30 A or 70 A or anywhere in between these values. Shore hardness is typically determined according to ASTM D2240.

Further details on the principles and operations of an AM system suitable for the present embodiments are found in U.S. Published Application No. 20100191360, the contents of which are hereby incorporated by reference.

Reference is now made to FIGS. 4A, 4B, 4C and 4D showing an image of an example object and schematic cross-sectional views depicting three example constructions for an interior of the object when formed by additive manufacturing, all according with some example embodiments. In some example embodiments, a visual appearance and shape of an object 112 is defined by model material 220 forming an outer shell of object 112. Within an inner volume 50 of object 112, model material 230 is included to mechanically support the three-dimensional shape of object 112 and may also optionally impart a desired weight to object 112 and/or a desired mechanical property to object 112.

Model material 220 and model material 230 may be the same or different materials. Optionally, model material 230 that is concealed may be selected to be a less costly material as compared to model material 220. In some example embodiments, model material 220 may be colored or multicolored while model material 230 may be mono-chromed or clear. Optionally, model material 220 and model material 230 may be selected to differ in mechanical properties. For example, one material may be selected to be more rigid or more elastic as compared to the other. Optionally, model material 220 and model material 230 are photopolymer materials.

According to some example embodiments, model material 230 is printed in a pattern that defines at least one structured air pocket 100 and preferably an array and/or lattice of structured air pockets 100. The at least one structured air pocket 100 may be formed in an internal volume of the object. Internal volume of an object as used herein refers to a volume that part of the object and within the object, e.g. a volume encompassed by an outer surface of the object. The pattern formed by model material 230 defines a shape and volume of each of structured air pockets 100 as well as their distribution in inner volume 50. The structured air pockets 100 may be polygonal in shape. According to some example embodiments, model material 230 is patterned to encapsulate each of structured air pockets 100 over a plurality of layers (AM layers). According to embodiments of the present invention, each of structured air pockets 100 is capped with a tapered top end 150 (in the Z direction). Tapered top end 150 is defined and closed with a gradual overhang formed with model material 230. In three dimensions, tapered top end 150 may be a wedge that has a triangle cross-section on an X-Z plane and a rectangular or square cross section in a Y-Z plane. The wedge angle of the tapered top end is configured to provide encapsulating structured air pocket 100 in a pre-defined number of layers without material 230 collapsing into structured air pocket 100 during the AM process. Structured air pockets 100 may be formed based on dispensing model material 230 in a defined patterned during the AM process and without interrupting the AM process.

In some example embodiments, structured air pocket 100 allows object 112 to deform under pressure and may impart elastic or flexible properties to object 112. For example, by pressing object 112 in an X direction structured air pockets 100 may be temporarily collapsed and object 112 deformed. When releasing the pressure, the encapsulated air may refill structured air pockets 100 and return object 112 to its original shape.

Figure 4A:
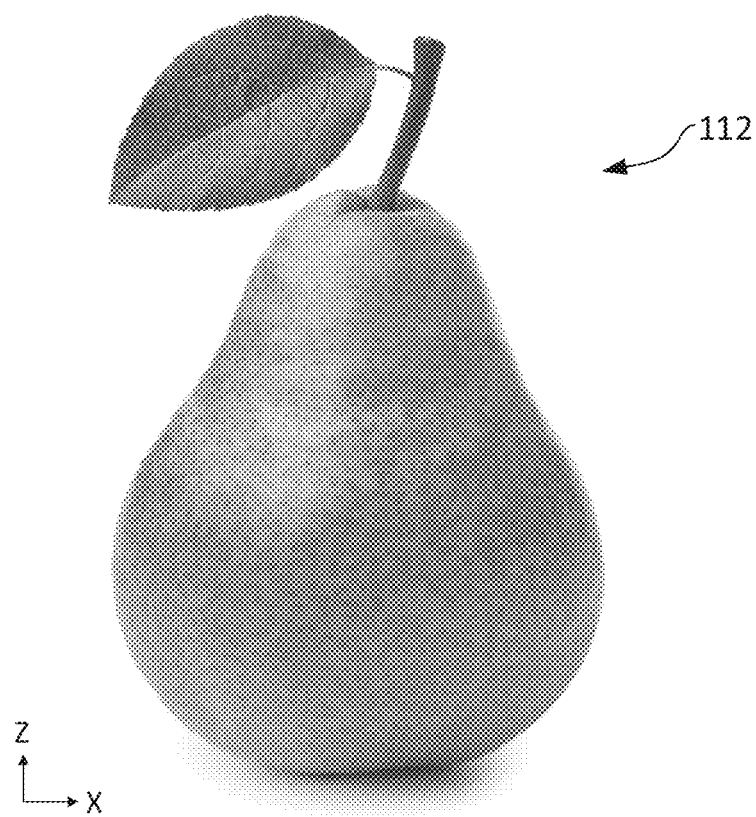
Figure 4B:
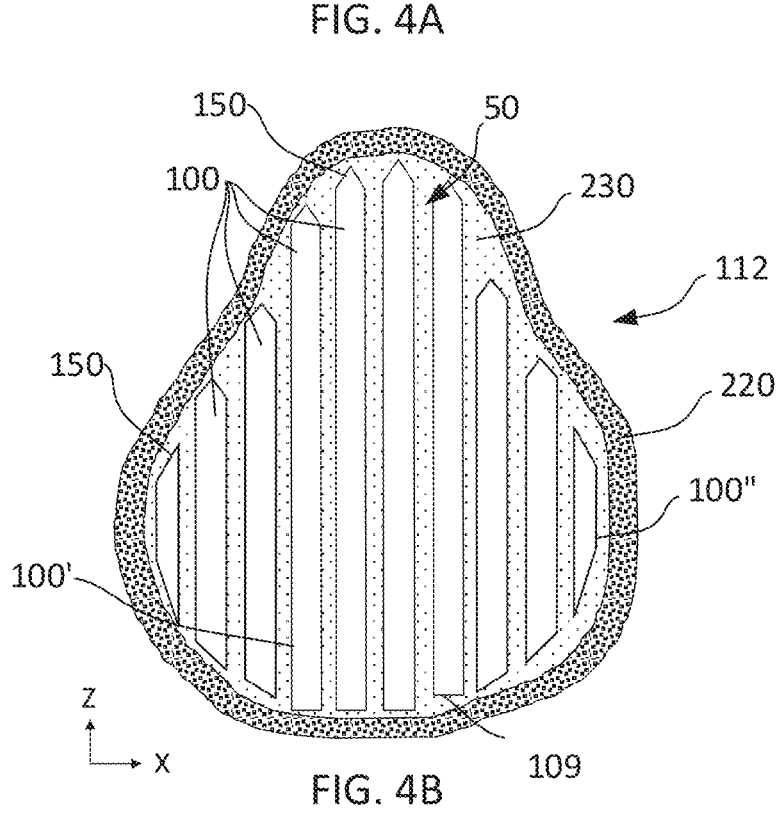
Figure 4C:
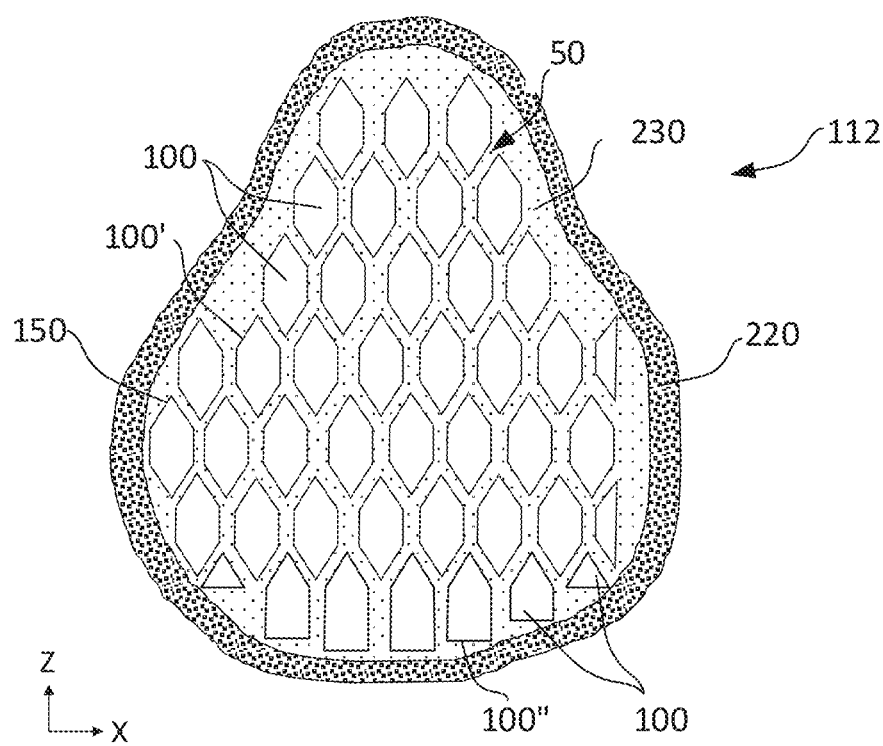
Figure 4D:
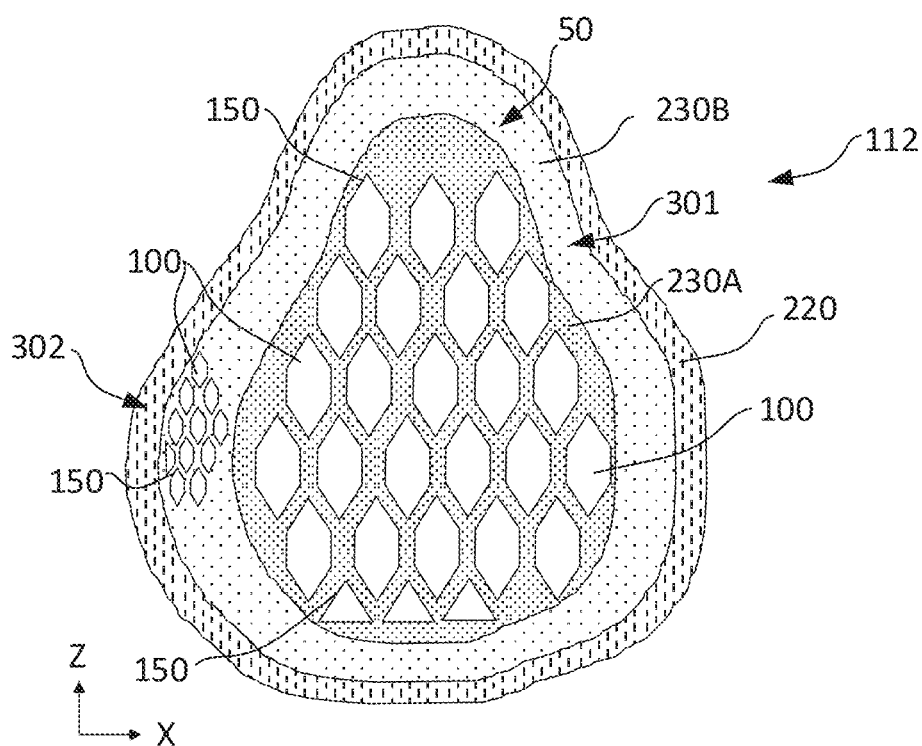

In some example embodiments, model material 230 may be patterned to define a substantially uniform lattice of structured air pockets 100 in inner volume 50 (FIG. 4C). In some example embodiments, model material 230 may be patterned to define a lattice of structured air pockets 100 in a plurality of distinct portions in inner volume 50 (FIG. 4D). For example, in FIG. 4D a first lattice 301 may be formed in a center of inner volume 50 and a second lattice 302 may be formed in a distinct area near an outer shell of object 112.

In some example embodiments, the pattern formed with model material 230 defines a lattice that includes structured air pockets 100 with a unit shape, e.g. unit shape 100' and additional structured air pockets 100 around a periphery of the lattice with modified shapes, e.g. modified shape 100" that are optionally configured to conform to geometry of object 112 or a portion of the volume of object 112 occupied by model material 230. Although different shapes for structured air pockets 100 may be contemplated, each of the different shapes includes the tapered top end 150.

In the particular example shown in FIG. 4B, model material 230 forms an array of structured air pockets 100 that are elongated in the Z direction and generally extend over a height of object 112. Optionally, a bottom end 109 of at least portion of structured air pockets 100 in FIG. 4B is flat.

Alternatively, in the particular examples shown in FIGS. 4C and 4D, model material 230 forms one or more lattices of structured air pockets 100 that have a hexagonal cross-sectional shape, e.g. in the X-Z plane or other polygonal shape. In some example embodiments, the structured air pockets 100 are positioned to form a staggered lattice pattern. Optionally, by staggering the structured air pockets 100 in model material 230, a denser lattice of structured air pockets 100 may be formed. In some example embodiments, the hexagonal shape of structured air pocket 100 in FIGS. 4C and 4D is in the shape of a square with two isosceles triangles, one upright on the top and one upside down on the bottom. Optionally, near edges of inner volume 50 other shapes for structured air pocket are defined.

In some example embodiments, it is desired to define a uniform lattice pattern. A uniform lattice pattern may exhibit substantially uniform mechanical properties throughout inner volume 50. Optionally, weight and volume of model material 230 used may be controlled by selecting density of the lattice and/or volume of structured air pockets 100. Optionally, size and shape of each of the structured air pockets 100 as well as a density and pattern of the lattice may be selectively defined to provide a desired mechanical property. Optionally, a pattern including relatively more structured air pockets 100 that have a relatively smaller volume provides more mechanical stability to object 112 as compared to a pattern including less structured air pockets 100, each having a relatively larger volume.

Referring now to FIG. 4D, in some additional example embodiments, one or more of model material 220 and model material 230 may be varied over different portions of object 112. The variability in model material may be selectively defined to provide a desired visual appearance, mechanical property and/or a tactile feel to specific parts of object 112. For example, FIG. 4D shows an inner volume 50 of object 112 including a first model material 230A and a second model material 230B. Optionally, a first lattice 301 may be defined with model material 230A and a second lattice 302 may be defined in model material 230B. Each of first lattice 301 and second lattice 302 may be formed with different size or shape structured air pockets 100 and with a different pattern of distribution across its volume. Optionally, first model material 230A is the same as second model material 230B.

FIGS. 5A and 5B are front and side schematic cross-sectional views of one example structured air pocket formed within an object during additive manufacturing according with some example embodiments. According to some example embodiments, model material 230 in an inner volume of an object built by AM may be patterned to include a lattice of structured air pockets 101. Structured air pocket 101 may for example include a cuboid shaped base 310 that is capped (closed or encapsulated) with a triangular shaped roof 320. Optionally, triangular shaped roof 320 has a triangular cross section that is an isosceles triangle. According to some example embodiments, the pattern for dispensing model material 230 defines a wedge angle Xs as well as a height Zh, width Xh and length Yh of each structured air pockets. According to some example embodiments, wedge angle Xs is less than 20°, less than 15° or 7°-20°. Dimensions of structured air pocket 101 as well as wedge angle Xs is defined so that model material 230 may encapsulate structured air pocket 101 within a defined number of layers over a regular AM process. According to some example embodiments, the negative angled slope Xs/2 in model material 230 is formed in a direction that has a high DPI so that fewer layers are required to complete the triangular peak and encapsulate the structured air pocket 101. Optionally, the negative angled slope Xs/2 in model material 230 is formed in the X-Z plane.

The pattern for dispensing model material 230 in a layer-wise manner during an AM process may be defined to form a lattice of structured air pockets 101. According to some example embodiments, distance between structured air pocket 101 Xb, Yb and Zb is defined by the pattern for dispensing model material 230. Dimensions of structured air pocket 101 as well as the lattice structure may be selected to provide a desired mechanical property to the object, e.g. object 112.

FIGS. 6A and 6B are front and side schematic cross-sectional views of another example structured air pocket formed within an object during additive manufacturing according with some example embodiments. According to some example embodiments, model material 230 in an inner volume of an object built by AM may be patterned to include a lattice of structured air pockets 102. Structured air pocket 102 may for example include a cuboid shaped middle section 370 that is capped (closed or encapsulated) with a triangular shaped roof 320 at a top end and a triangular shaped floor or base 350 at a bottom end 190. Optionally, triangular shaped roof 320 has a triangular cross section that is an isosceles triangle. Optionally, triangular shaped base 350 is identical to triangular shaped roof 320 so that structured air pockets 102 are symmetrical. The symmetry of structured air pockets 102 may provide for forming a staggered lattice that is densely packed. Dimensions of structured air pockets 102 as well as dimensions of space between structured air pockets 102 in a lattice may be defined by the pattern for dispensing model material 230. Alternatively, an angle Xs1 may be other than angle Xs2. For example angle Xs2 may be larger than Xs1 and a height of triangular shaped base 350 may be less than that of triangular shaped roof 320. Although, angle Xs1 is limited due to the mechanical stability of the overhang in model material 230 surrounding triangle 320, angle Xs2 does not have this restraint and therefore may be selected over a wider range of angles.

FIGS. 7A and 7B are front and side schematic cross-sectional views of yet another example structured air pocket formed within an object during additive manufacturing according with some example embodiments. According to some example embodiments, model material 230 in an inner volume of an object built by AM may be patterned to include a lattice of structured air pockets 103. Structured air pocket 102 may for example be diamond shape formed with a triangular shaped roof 320 at a top end and a triangular shaped base 350 at a bottom end. Triangular shaped roof 320 and a triangular shaped base 350 may have the same dimensions to provide symmetry or may have different dimensions.

FIGS. 8A and 8B are front and side schematic cross-sectional views of an example lattice of structured air pockets symmetrically aligned in both a front and side plane according with some example embodiments. According to some example embodiments, model material 230 in an inner volume of an object built by AM may be patterned to include a define lattice of the structured air pockets 102. In the example shown in FIGS. 8A and 8B, the pattern of model material 230 is a square grid both in an X-Z plane and a Y-Z plane with structured air pockets 102.

FIGS. 9A and 9B are front and side schematic cross-sectional views of an example lattice of structured air pockets that is angled with respect to a side plane according with some example embodiments. In this example, the pattern formed with model material 230 defines a lattice with structured air pockets 102 that is angled with respect to the Z-Y plane. The defined orientation of the lattice may be used to provide a desired mechanical property in a desired direction. For example, a direction at which the object may be deformed may be selected based on the defined orientation of the lattice.

FIGS. 10A and 10B are front and side schematic cross-sectional views of an example lattice of structured air pockets that is staggered in a front plane and FIGS. 11A and 11B are front and side schematic cross-sectional views of an example lattice of structured air pockets that is staggered in both a front and a side plane according with some example embodiments. According to some example embodiments, staggering structured air pocket 102 may provide a denser lattice of structured air pockets. A distance between structured air pockets 102 may be defined based on defining dimensions of structured air pocket 102 and parameters dx, Gx, dy and Gy. In the examples shown in FIGS. 10A, 10B, 11A and 11B, triangular bases 350 of one structured air pocket 102 is aligned with a triangular cap 320 of another neighboring structured air pockets 102.

FIGS. 12A and 12B are front and side schematic cross-sectional views of another example lattice of structured air pockets that is staggered in a front plane according with some example embodiments. In this example, triangular bases 350 of one structured air pocket 102 is not aligned with a triangular cap 320 of another neighboring structured air pocket 102 and therefore forms less densely packed lattice as compared to the lattice in FIGS. 11A and 11B.

FIG. 13 is a schematic drawing of a tapered tip according with some example embodiments. According to some example embodiments, a tapered top end 150 is selectively designed to enclose a structured air pocket within a defined number of layers during an AM process without a need to interrupt the AM process to support a structure of the air pockets with auxiliary elements. According to some example embodiments, a wedge angle Xs is defined based on an overhang angle Xs/2 of the model material surrounding tapered top end 150. The overhang angles that may provide for closing or encapsulating structured air pocket may vary based on properties of the model material as well as parameters of the AM process. In some example embodiments, the overhang angle Xs/2 is between 3°-9°. Dimensions of tapered top end 150 may be defined based on overhang angles that provide encapsulating a structured air pocket in an AM process without model material collapsing into the structured air pocket. In some example embodiments, the range is selectively adjusted based on properties of the material and optionally printing parameters. In some example embodiments, a printing parameter based on which the range is adjusted may include time between when a voxel of liquid building material formulation 124 is dispensed and cured with radiation sources 18 (FIG. 1A). Another example printing parameter based on which the range is adjusted may include time when a voxel of liquid building material formulation 124 is dispensed and leveled with leveling device 132 (FIG. 1A). Another parameter may be dimensions of nozzles in nozzle array 124 (FIGS. 2A-2C). Example material properties that be considered when adjusting the range include one or more of dimensions of a voxel of liquid building material formulation 124 and viscosity of the liquid building material formulation 124.

FIG. 14 is a schematic drawing of showing an example construction of a portion of a structured air pocket in pixel resolution according with some example embodiments. According to some example embodiments, defines shifts of one voxel of model material 230 per a defined number of layers to form tapered top end 150 with a desired wedge angle. In some examples, when the tapered top end 150 is defined in the X-Z plane, Sz(X) may represent the defined number of layers for each voxel shift. Sz(X) may be determined based on the following relationship:

$$Sz(x) = Vx/(Vz * \tan(Xs/2));  \quad \text{Equation (1)}$$

Where:
  Vx is length of voxel in X direction
  Vz is a height of voxel in the Z direction (the height of a layer); and
  Xs/2 is the selected overhang angle.

Figure 15A:
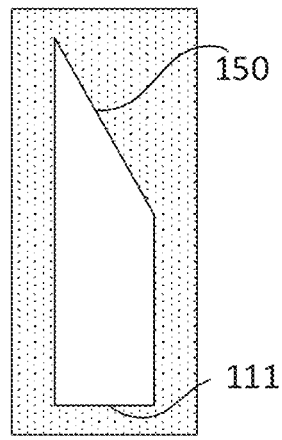
Figure 15B:
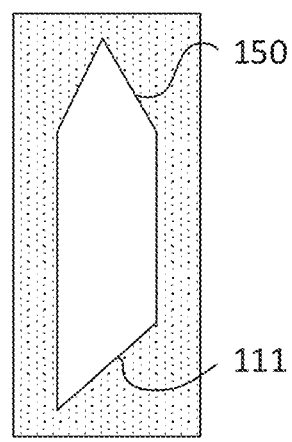
Figure 15C:
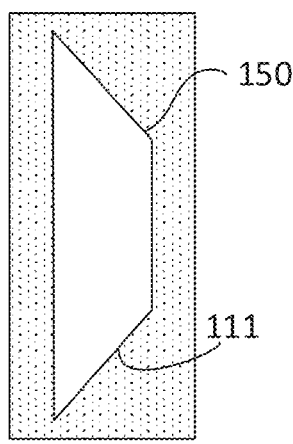
Figure 15D:
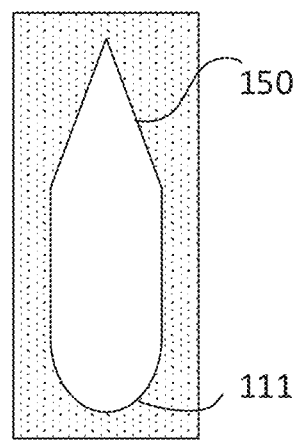

FIGS. 15A, 15B, 15C and 15D are front schematic cross-sectional views of other example structured air pockets formed within an object during additive manufacturing according with some example embodiments. Although tapered top end 150 may be restricted based on the range of possible angles Xs, either symmetrical (FIG. 15B) or unsymmetrical tapering (FIG. 15A) may be defined. A floor or base 111 of a structured air pocket may have different shapes, e.g. may be flat (FIG. 15A), angled (FIG. 15C) or rounded (FIG. 15D).

Figure 16A:
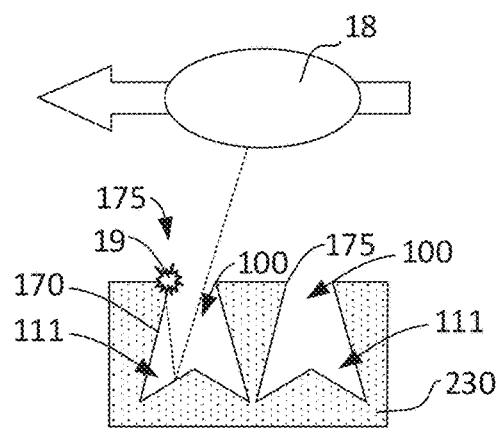
Figure 16B:
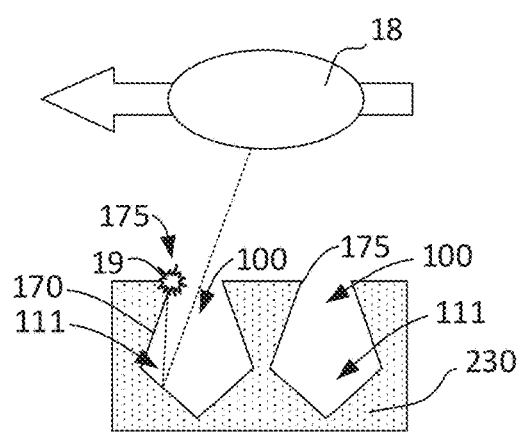
Figure 16C:
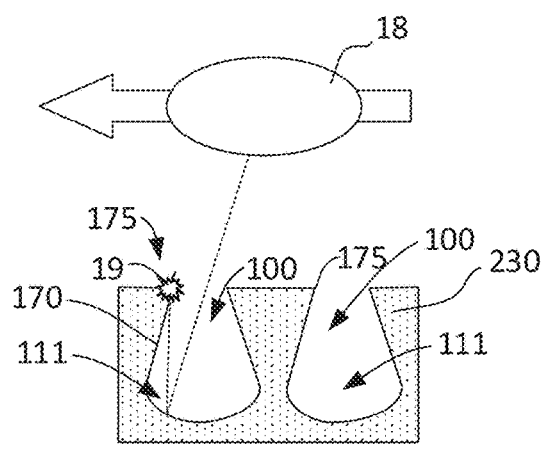
Figure 16D:
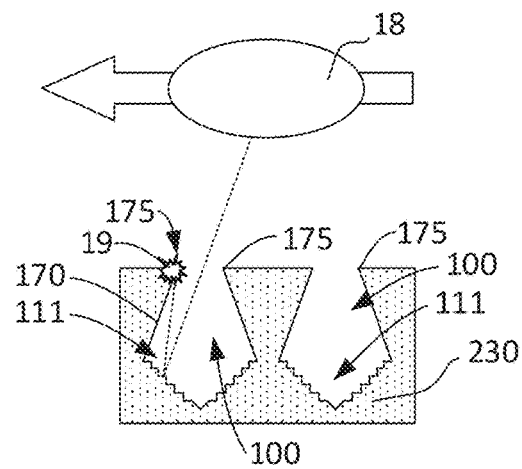

FIGS. 16A, 16B, 16C and 16D are four example structured air pocket floor geometries configured to enhance curing of modeling material forming an overhang around a structured air pocket, all in accordance with some example embodiments. According to some example embodiments, a base or floor 111 of a structured air pocket 100 may be shaped to reflect radiation received from radiation source 18 toward edges 175 of overhang 170 as the object with structured air pocket 100 is being constructed. Reflecting radiation 19 toward edges 175 of overhang 170 may enhance polymerization of modeling material forming overhang 170 and thereby prevent liquid resin from falling into structured air pocket 100 during printing and/or prevent collapsing of overhang 170. In some example embodiments, a floor geometry may be selected with a light propagation simulation software installed in host computer 24 that is configured to simulate light reflection (e.g. UV light) in structured air pocket 100 during its construction. Optionally, the simulation software may suggest a floor geometry that boosts radiation towards overhang 170 to a desired level based on input from the user. Input may include one or more of a desired size of structured air pocket 100, a desired shape of structured air pocket 100 and a property of model material 230. Optionally, a floor geometry may be chosen manually, e.g. from a selection list displayed on host computer 24. In some example embodiments, floor 111 may be defined to have a convex projection (FIG. 16A). Optionally, floor 111 may be defined to be concave (FIG. 16B). Optionally, angle of the convex or concave shape is defined based on a height of structured air pocket 100. Optionally, floor 111 is rounded (FIG. 16C). In some example embodiments floor 111 may be defined to have a rough and/or jagged surface that may generally scatter radiation received from radiation source 18 (FIG. 16D).

FIGS. 17A, 17B and 17C are three example construction modifications configured to enhance curing of modeling material forming an overhang around a structured air pocket, all in accordance with some example embodiments. According to some example embodiments, a portion of model material 230 surrounding structured air pocket 100 is modified to boost and/or accelerate polymerization of modeling material forming overhang 170 and thereby prevent liquid resin from falling into structured air pocket 100 during printing and/or prevent collapsing of overhang 170. In some example embodiments, floor 111 and/or overhang 170 (or a selected portion of floor 111 and/or overhang 170) is constructed with a radiation reflecting material 235 (FIG. 17A). Optionally, radiation reflecting material is UV reflective material, e.g. white material and/or white material comprising $TiO_2$ particles. Optionally reflective material 235 is configured to boost reflection of radiation from radiation source 18 toward overhang 170. Optionally, a thickness of a modified layer of model material may be 1 μm to 5 mm depending on size of structured air pocket and density of the lattice.

In some example embodiments, a portion of floor 111 and/or overhang 170 is constructed or lined with model material 236 that comprises a higher amount of photo-initiators as compared to model material 230 (FIG. 17B). Optionally, model material 236 has a concentration of photo-initiators that is 5% or more, e.g. 5%-7%, 5%-10%. Model material 236 may be more quickly and readily polymerized compared to model material 230. Boosting polymerization based on increasing the amount of photo-initiators in modeling material used for lining overhang 170 may prevent liquid resin from falling into structured air pocket 100 during printing and/or prevent collapsing of the overhang 170.

Although an increased amount of photo-initiators comprised in a modeling material, e.g. greater than 5% may generally be undesirable as it may cause curling of the printed object, e.g. deformation, the present inventors have found that printed object with structured air pockets 100 are less prone to curling and therefore a model material comprising an increased amount of photo-initiators may be used in lining air pockets without leading to significant deformation of the printed object.

In some example embodiments, polymerization of modeling material forming overhang 170 of structured air pocket 100 may be boosted based on filling structured air pocket 100 with a liquid 335 that is not cured as the air pocket is being constructed (FIG. 17C). Liquid 335 may help preventing oxygen inhibition of polymerization at the internal surfaces being formed, while enabling their radiation curing, e.g. UV curing. Optionally, liquid 335 is water. Oxygen concentration and coefficient of diffusion in water is known to be significantly smaller than in the air. Attenuation of UV radiation and/or decrease in generation of radicals from photo-initiators may be insignificant due to the relatively small volume of liquid in structured air pocket 100. Optionally, the height of liquid may be 1-10 mm based on a size of a structured air pocket.

In some example embodiments, one or more of the modifications shown in FIGS. 17A, 17B and 17C may be combined. For example, reflective material 235 may be used to form floor 111 and model material 236 that comprises a higher amount of photo-initiators may be used to form or line overhang 170. Optionally, reflective material 235 may be used to form floor 111, and model material 236 that comprises a higher amount of photo-initiators may be used to form or line overhang 170. Optionally and additionally, liquid 335 may be added to structure air pocket 100. In some other embodiments, both floor 111 and overhangs 170 are formed by a modeling material that is both reflective and have a high amount of photo-initiator (e.g. >5% of the total formulation). In some other embodiments, a reflective and/or high load photo-initiator modeling material is not limited to the floor and/or overhangs of the air pockets but is used to construct a whole region of the printed object where one or more structured air pockets are located.

FIG. 18 shows a plurality of additional devices that may be used to enhance curing of modeling material forming an overhang around a structured air pocket, all in accordance with some example embodiments. According to some example embodiments, block 128 of apparatus 114 (FIG. 1A) may be modified to include additional devices to enhance curing of modeling material forming an air pocket 170 during printing. Optionally, block 128 may include an air blower 15, e.g. a fan that is configured to decrease temperature of a layer including layers of structured air pocket 100 as it is being constructed. Cooling may increase viscosity of the modeling material after deposition, thereby preventing its dripping onto the floor of air pocket 100. In some example embodiments, curing may be enhanced by adding an additional radiation source 18 and/or repeating scanning with one or more radiation sources 18.

In some example embodiments, apparatus 114 comprises an enclosure 119 within which oxygen concentration may be reduced to enhance polymerization of modeling material. Optionally, air may be suctioned out of enclosure 119 using a pump 113. Optionally, oxygen concentration may be reduced by pumping air out of enclosure 119 using pump 113 and/or by filling enclosure 119 with an inert gas from an inert gas source 117.

FIG. 19 is a simplified flow chart of an example additive manufacturing method of printing an object including one or more structured air pockets in accordance with some example embodiments. According to some example embodiments, an interior volume of an object is configured to include a lattice of structured air pockets. The defined lattice may provide a desired mechanical property to the object and/or may provide for using less material in the AM process of building the object. The mechanical properties of the object that may be adjusted based on the lattice of structured air pockets may include weight, deformability and elasticity. According to some embodiments, a method of forming the object by AM includes, selecting a volume in an object to include a structured air pocket(s) (block 405), selecting the size and/or shape of the structured air pockets (block 410), selecting orientation of the structured air pocket(s) (block 415) and selecting the distribution pattern of the air pocket(s) (block 420). Based on these selections, the lattice may be defined.

Optionally, a shape of a structured air pocket floor is defined to enhance reflection of radiation from the curing radiation source. According to some example embodiments, one or more parameters for forming overhang, walls and/or floor of a structured air pocket may be defined (block 423). Optionally, a reflective material is selected for forming the floor and/or internal walls of the structured air pocket. Optionally, a model material comprising a relatively high amount of photo-initiators is selected for forming or lining an overhang and/or walls of a structured air pocket. Optionally, a structured air pocket may be selected to be filled with a liquid.

According to some example embodiments, a layer-wise pattern of model material that will form the selected lattice is defined according to blocks 405-423 (block 425) and the object is printed by additive manufacturing based on the layer-wise pattern (block 430).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support and calculated support in the following examples.

Examples

Reference is now made to the following example, which together with the above descriptions illustrates some embodiments of the invention in a non-limiting fashion.

TABLE 1

| DPIx | DPIy | Layer height (μm) | Vx (μm) | Vy (μm) | Vz (μm) | Xs (°) | Xh (μm) | Sz (X) | Sz (Y) | Zr (μm) | # Layers |
|------|------|-------------------|---------|---------|---------|--------|---------|--------|--------|---------|----------|
| 600 | 300 | 27 | 42.3 | 84.7 | 27 | 20 | 3000 | 9 | 18 | 850 | 31 |
| 600 | 600 | 27 | 42.3 | 42.3 | 27 | 20 | 3000 | 9 | 9 | 850 | 31 |
| 600 | 300 | 27 | 42.3 | 84.7 | 27 | 15 | 3000 | 12 | 24 | 11406 | 422 |
| 600 | 300 | 27 | 42.3 | 84.7 | 27 | 12 | 3000 | 15 | 30 | 14285 | 529 |
| 600 | 300 | 27 | 42.3 | 84.7 | 27 | 10 | 3000 | 18 | 63 | 17142 | 635 |
| 600 | 300 | 14 | 42.3 | 84.7 | 14 | 15 | 3000 | 23 | 46 | 11406 | 815 |
| 600 | 300 | 54 | 42.3 | 84.7 | 54 | 15 | 3000 | 6 | 12 | 11406 | 211 |

Table 1 shows example calculations for determining a number of layers needed to encapsulate a structured air pocket 100 with a tapered top end 150. DPIx is pixel resolution in the X direction during printing by an AM process, DPIy is resolution in the Y direction during printing by an AM process. Vx, Vy and Vz are X, Y and Z dimensions respectfully for a voxel (or pixel) of material dispensed by the printer (nozzles 122). Sz(x) and Sz(Y) are defined number of layers for each voxel shift in each of the X and Y direction respectfully. According to some example embodiments, a pattern for forming one and preferably a lattice of structured air pockets may be defined based on relationships as described in Table 1.

Figure 20C:
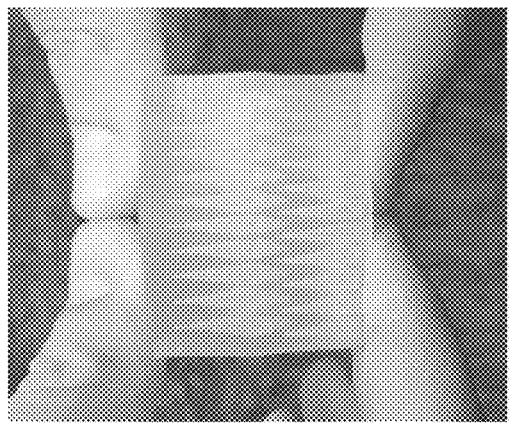
Figure 20D:
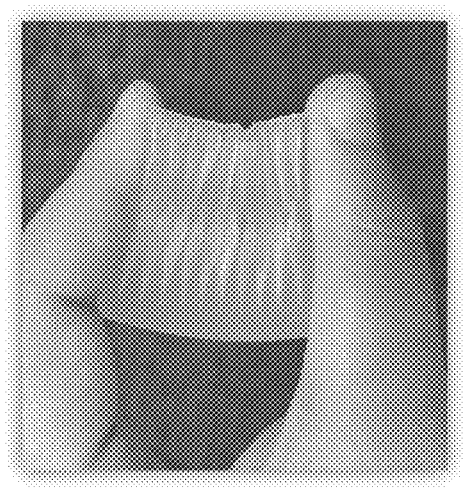
Figure 20A:
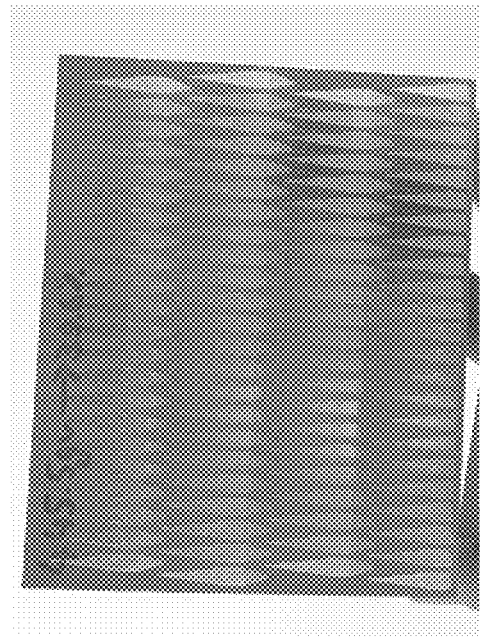
Figure 20B:
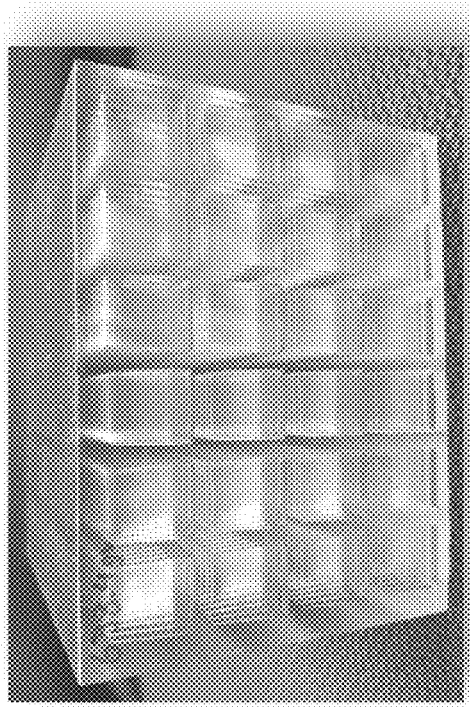

FIGS. 20A, 20B, 20C and 20D are images of an example object formed by an additive manufacturing method including a lattice of structured air pockets, according with some example embodiments. The object was fabricated with a transparent material so that the structured air pockets are visible. Dimensions of the structured air pockets are based on dimensions listed in the fourth row of Table 1. The object is shown in different orientations. FIG. 20A shows a hexagon shape for each structured air pocket in the X-Z plane. As can be seen in FIG. 20A, a tapered top end has an angle of less than 15° while the base has a wider angle. FIG. 20B shows a square shape for each structured air pocket in the Y-Z plane when viewed from a different angle. FIG. 20C shows that based on the orientation of the lattice, the object is less flexible in the Z direction than shown in FIG. 20D, which shows the object can be deformed in the X direction based on the orientation of the structured air pockets.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An additive manufacturing method for printing an object, the method comprising:
receiving three-dimensional printing data corresponding to the object;
defining an internal region of the object to be formed with a structured air pocket; and
printing the object with an additive manufacturing system, wherein said object comprises an internal region formed with a lattice of closed structured air pockets, wherein at least two of said air pockets in said lattice are isolated from each other; and
wherein said printing comprises scanning along a scan direction, to form, for at least one air pocket, an overhang that is tapered along said scan direction and is non-tapered along a cross scan direction.

2. The method of claim 1, wherein printing the object is carried out continuously without interrupting the printing sequence.

3. The method of claim 1, wherein the structured air pocket comprises a floor in addition to the overhang.

4. The method of claim 3 wherein the overhang is configured to be self-supporting.

5. The method of claim 3, wherein the overhang has an angle of 5°-15° or 5°-10°.

6. The method of claim 3, wherein the overhang is formed along one of a scan direction and a cross scan direction.

7. The method of claim 1, wherein the structured air pocket comprises a floor in addition to the overhang and wherein the method further comprises defining a geometry of the floor to reflect light radiation towards the overhang.

8. The method of claim 1, wherein the structured air pocket has a diamond shaped cross-section along the one of the scan direction and the cross scan direction.

9. The method of claim 1, wherein the structured air pocket has a hexagonal shape along the one of the scan direction and the cross scan direction.

10. The method of claim 1, wherein the structured air pocket has a rectangular or a square cross-section along the other one of the scan direction and the cross scan direction.

11. The method of claim 3, wherein the printing resolution is greater in the scan direction and wherein the overhang is formed along the scan direction.

12. The method of claim 1, wherein the lattice is a staggered lattice.

13. The method of claim 1, wherein the additive manufacturing system is an inkjet system.

14. The method of claim 1, wherein the object is printed with at least one photopolymer material.

15. The method of claim 3, wherein the overhang is built with a modeling material that includes a higher concentration of photo-initiator than the modeling material used outside the internal region.

16. The method of claim 15, wherein the modeling material that includes a higher concentration of photo-initiator comprises a photo-initiator load greater than 5% of the total weight.

17. The method of claim 1, wherein the structured air pocket includes a floor built with a modeling material configured to reflect ultraviolet light.

18. The method of claim 1, further comprising filling the structured air pocket with a liquid during printing the object.

19. The method of claim 1, further comprising reducing the concentration of oxygen in the environment of the object being printed.

20. An additive manufacturing method for printing an object, the method comprising:
    receiving three-dimensional printing data corresponding to the object;
    defining an internal region of the object to be formed with a structured air pocket having a floor and an overhang; and
    printing the object with an additive manufacturing system, wherein said object comprises an internal region formed with a lattice of closed structured air pockets, wherein at least two of said air pockets in said lattice are isolated from each other, and wherein the overhang is built with a modeling material that includes a higher concentration of photo-initiator than the modeling material used outside the internal region.

* * * * *